US012771142B2

(12) United States Patent
Tian et al.

(10) Patent No.: US 12,771,142 B2
(45) **Date of Patent: *Oct. 20, 2026**

(54) QUICK CHARGING METHOD, MOBILE TERMINAL, AND POWER ADAPTER

(71) Applicant: GUANGDONG OPPO MOBILE TELECOMMUNICATIONS CORP., LTD., Dongguan (CN)

(72) Inventors: Chen Tian, Dongguan (CN); Jialiang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 444 days.

This patent is subject to a terminal disclaimer.

(21) Appl. No.: 18/363,715

(22) Filed: Aug. 1, 2023

(65) Prior Publication Data

US 2024/0022105 A1 Jan. 18, 2024

Related U.S. Application Data

(63) Continuation of application No. 17/544,587, filed on Dec. 7, 2021, now Pat. No. 11,791,651, which is a (Continued)

(51) Int. Cl.

*H02J 7/04* (2006.01)
*H02J 7/42* (2026.01)

(Continued)

(52) U.S. Cl.

CPC .................. *H02J 7/04* (2013.01); *H02J 7/42* (2026.01); *H02J 7/92* (2026.01); *H02J 7/47* (2026.01);

(Continued)

(58) Field of Classification Search

CPC ........ H02J 7/00034; H02J 7/0071; H02J 7/04; H02J 7/42; H02J 7/92

(Continued)

(56) References Cited

U.S. PATENT DOCUMENTS

| | | | | |
|---|---|---|---|---|
| 4,196,417 A * | 4/1980 | Fasching | H04Q 9/14 | 340/9.1 |
| 4,471,435 A * | 9/1984 | Meisner | G01V 5/102 | 250/262 |

(Continued)

FOREIGN PATENT DOCUMENTS

| | | |
|---|---|---|
| EP | 3159999 | 1/2019 |
| JP | 2007288889 | 11/2007 |
| KR | 20140120699 | 10/2014 |

OTHER PUBLICATIONS

"Endianness White Paper" Intel, Published Nov. 15, 2004, Accessed online Feb. 11, 2004, https://www.pascal-man.com/navigation/faq-java-browser/jython/endian.pdf (Year: 2004).*

(Continued)

*Primary Examiner* — John T Trischler
(74) *Attorney, Agent, or Firm* — Hodgson Russ LLP

(57) ABSTRACT

After a mobile terminal recognizes a type of a power adapter, the mobile terminal transmits indication information to the power adapter. The indication information is configured to indicate that the mobile terminal has recognized the type of the power adapter and instruct the power adapter to activate a quick charging process. The power adapter then negotiates with the mobile terminal via the quick charging process to determine charging parameters, and charges a battery of the mobile terminal in a multi-stage constant current mode.

17 Claims, 11 Drawing Sheets

Related U.S. Application Data continuation of application No. 16/705,544, filed on Dec. 6, 2019, now Pat. No. 11,233,416, which is a continuation of application No. 15/405,610, filed on Jan. 13, 2017, now Pat. No. 10,581,262, which is a continuation of application No. PCT/CN2016/070204, filed on Jan. 5, 2016.

(51) Int. Cl.

| | |
|---|---|
| ***H02J 7/92*** | (2026.01) |
| *H02J 7/47* | (2026.01) |
| *H02J 7/68* | (2026.01) |
| *H02J 7/70* | (2026.01) |
| *H02J 7/90* | (2026.01) |
| *H04M 19/00* | (2006.01) |
| *H04M 19/08* | (2006.01) |

(52) U.S. Cl.
CPC ................ *H02J 7/68* (2026.01); *H02J 7/751* (2026.01); *H02J 7/90* (2026.01); *H04M 19/00* (2013.01); *H04M 19/08* (2013.01)

(58) Field of Classification Search
USPC ........................................................ 320/106
See application file for complete search history.

(56) References Cited

U.S. PATENT DOCUMENTS 4,673,861 A * 6/1987 Dubovsky ................ H02J 7/00 455/100
4,679,160 A * 7/1987 Whitener ................ G01W 1/14 73/632
4,684,872 A * 8/1987 Stewart ................ H02J 7/0047 320/152
4,716,353 A * 12/1987 Engelmann ........... H02M 3/285 320/139
5,103,156 A * 4/1992 Jones ................ H02J 7/007194 320/150
5,173,855 A * 12/1992 Nielsen .............. G05B 19/0426 239/69
5,272,475 A * 12/1993 Eaton ....................... G08B 6/00 320/155
5,521,512 A * 5/1996 Hulina ................... G01R 31/11 324/76.38
5,592,069 A * 1/1997 Dias ......................... G01K 7/13 320/152
5,694,024 A * 12/1997 Dias .................... H02J 7/00047 429/90
5,717,306 A * 2/1998 Shipp .................... H01M 10/48 429/90
5,757,799 A * 5/1998 LaRue ............... H04Q 11/0478 370/417
5,812,879 A * 9/1998 Moro .................... G06F 13/385 710/72
5,867,006 A * 2/1999 Dias ......................... G01K 7/13 320/110
5,905,362 A * 5/1999 Nagano ..................... H02J 7/44 320/125
6,018,228 A * 1/2000 Dias ......................... G01K 7/13 320/110
6,222,347 B1 * 4/2001 Gong ...................... G06F 1/263 320/164
6,282,611 B1 * 8/2001 Hamamoto ........... H02J 7/0063 381/124
6,285,962 B1 * 9/2001 Hunter ................... G11C 29/56 713/1
6,445,936 B1 * 9/2002 Cannon ............ H04W 52/0274 455/574
6,480,799 B2 * 11/2002 Hunter ................... G11C 29/56 713/1
6,667,624 B1 * 12/2003 Raichle ................ G01R 31/367 320/136
6,784,637 B2 * 8/2004 Raichle ..................... H02J 7/00 324/426
6,842,707 B2 * 1/2005 Raichle ..................... G06F 8/65 320/125
6,946,817 B2 * 9/2005 Fischer ................. H02J 7/0042 320/132
6,969,970 B2 * 11/2005 Dias ...................... H01M 10/48 320/106
6,986,082 B2 * 1/2006 Hsiao ..................... G11C 29/48 365/201
7,041,055 B2 * 5/2006 Young ................ A61B 17/3423 606/198
7,076,375 B2 * 7/2006 Raichle ..................... H02J 7/00 702/80
7,086,334 B2 * 8/2006 Jennings, III ........... F42D 1/055 320/155
7,148,657 B2 * 12/2006 Raichle ................. H02J 7/0069 320/162
7,259,539 B2 * 8/2007 Suzuki ................ H02J 7/00047 320/110
7,307,385 B2 * 12/2007 Yamamoto ............ H05B 45/38 315/121
7,498,772 B2 * 3/2009 Palladino ............ G01R 31/367 320/132
7,570,014 B2 * 8/2009 Teraoka .................... H02J 7/44 320/106
7,573,159 B1 * 8/2009 Deluliis ................ H02J 7/0042 307/150
7,629,775 B2 * 12/2009 Nishida ................. H01M 10/48 320/136
7,663,338 B2 * 2/2010 Guthrie ..................... H02J 7/00 429/96
7,672,798 B2 * 3/2010 Raichle ................. H01M 10/46 702/132
7,737,657 B2 * 6/2010 Fischer ..................... H02J 7/02 320/111
7,904,625 B1 * 3/2011 Jiang ................... G06F 13/4081 710/110
7,956,330 B2 * 6/2011 Nishino ............... A61B 6/4233 320/DIG. 11
8,013,568 B2 * 9/2011 Park ...................... H02J 7/0044 320/108
8,049,462 B2 * 11/2011 Kung .................... H02J 7/0031 320/155
8,080,979 B2 * 12/2011 Abe .......................... H02J 7/04 320/152
8,111,040 B2 * 2/2012 Guthrie ................... G06F 1/266 429/96
8,148,940 B2 * 4/2012 Liu ....................... H02J 7/0071 362/183
8,180,584 B2 * 5/2012 Raichle ................. H01M 10/46 702/132
8,198,861 B2 * 6/2012 Kudou ................. H01R 13/713 320/160
8,258,750 B2 * 9/2012 Yamada ................ H01M 10/44 320/128
8,259,221 B1 * 9/2012 Kaplan ................ H04N 23/651 348/207.1
8,260,200 B2 * 9/2012 Shimizu ............. G06K 19/0726 455/193.1
8,281,048 B2 * 10/2012 Fujii ................... G06F 13/4081 710/16
8,289,000 B2 * 10/2012 Nishida ............... H02M 3/1588 320/145
8,447,893 B2 * 5/2013 Tauscher ............... G06F 13/387 710/36
8,466,659 B2 * 6/2013 Shipp ..................... A61B 17/34 320/135
8,548,659 B2 * 10/2013 Tanaka .................. B60W 20/00 180/65.265
8,725,338 B2 * 5/2014 Tanaka .................... B60L 1/006 320/109
8,838,171 B2 * 9/2014 Jang ................. H04M 1/72409 455/557
8,892,912 B2 * 11/2014 Lai .......................... G06F 1/266 713/300

(56) References Cited

U.S. PATENT DOCUMENTS

| | | | | |
|---|---|---|---|---|
| 8,941,129 | B1 * | 1/2015 | Gershowitz | H01L 25/0753 |
| | | | | 257/98 |
| 8,941,361 | B2 * | 1/2015 | Bae | G06F 1/263 |
| | | | | 320/137 |
| 8,941,496 | B2 * | 1/2015 | Batra | G06K 19/07749 |
| | | | | 340/572.1 |
| 8,975,821 | B2 * | 3/2015 | Gershowitz | H05B 45/3725 |
| | | | | 315/297 |
| 9,122,813 | B2 * | 9/2015 | Oljaca | G06F 1/26 |
| 9,153,984 | B2 * | 10/2015 | Ono | H02J 7/485 |
| 9,153,995 | B2 * | 10/2015 | Walley | H02J 7/02 |
| 9,155,145 | B2 * | 10/2015 | Gershowitz | H05B 45/44 |
| 9,155,550 | B2 * | 10/2015 | Shipp | A61B 17/34 |
| 9,158,325 | B1 * | 10/2015 | Lim | G05F 5/00 |
| 9,246,554 | B2 * | 1/2016 | Maguire | H02J 50/40 |
| 9,247,594 | B2 * | 1/2016 | Gershowitz | H01L 25/0753 |
| 9,291,654 | B2 * | 3/2016 | LeMay | A61B 5/7221 |
| 9,351,358 | B2 * | 5/2016 | Gershowitz | H10H 20/857 |
| 9,356,460 | B2 * | 5/2016 | Wong | G06F 1/266 |
| 9,395,778 | B2 * | 7/2016 | Fritchman | H02J 7/00 |
| 9,436,261 | B2 * | 9/2016 | Yun | G06F 1/3212 |
| 9,438,064 | B2 * | 9/2016 | Keeling | H02J 50/90 |
| 9,450,424 | B2 * | 9/2016 | Chu | H02J 50/80 |
| 9,468,052 | B2 * | 10/2016 | Gershowitz | H05B 45/3725 |
| 9,509,160 | B2 * | 11/2016 | Zhao | H02J 7/00 |
| 9,509,161 | B2 * | 11/2016 | Son | G06F 1/263 |
| 9,614,446 | B2 * | 4/2017 | Bisschop | H02J 7/04 |
| 9,621,054 | B2 * | 4/2017 | Miyamoto | H02M 3/33507 |
| 9,634,517 | B2 * | 4/2017 | Davis | G06F 1/26 |
| 9,662,139 | B2 * | 5/2017 | Shipp | A61B 17/22031 |
| 9,678,538 | B2 * | 6/2017 | Tsutsui | G06F 1/1632 |
| 9,698,693 | B2 * | 7/2017 | An | H02M 3/1588 |
| 9,716,401 | B2 * | 7/2017 | Wojcik | H02J 50/80 |
| 9,728,995 | B2 * | 8/2017 | Matsumura | H02J 7/0029 |
| 9,730,284 | B2 * | 8/2017 | Gershowitz | H05B 45/56 |
| 9,755,450 | B2 * | 9/2017 | Wu | H02J 7/00036 |
| 9,824,045 | B2 * | 11/2017 | Waters | G06F 13/4282 |
| 9,847,663 | B2 * | 12/2017 | Nishikawa | H02J 7/007188 |
| 9,859,740 | B2 * | 1/2018 | Chi | H02J 7/00 |
| 9,864,421 | B2 * | 1/2018 | Li | G06F 13/4282 |
| 9,866,229 | B2 * | 1/2018 | Huang | H02M 3/00 |
| 9,871,393 | B2 * | 1/2018 | Hao | H01M 10/443 |
| 9,893,547 | B2 * | 2/2018 | Wu | H02J 7/0031 |
| 9,899,848 | B2 * | 2/2018 | Hu | H02J 7/007182 |
| 9,941,808 | B2 * | 4/2018 | Walley | H02M 7/003 |
| 9,944,192 | B2 * | 4/2018 | Ricci | B60L 53/38 |
| 9,948,087 | B2 * | 4/2018 | Haines | G01R 31/3277 |
| 9,948,134 | B2 * | 4/2018 | Wojcik | H01M 10/46 |
| 9,985,449 | B2 * | 5/2018 | Zhang | H02J 7/04 |
| 9,996,130 | B2 * | 6/2018 | Rhee | G06F 1/266 |
| 9,998,611 | B2 * | 6/2018 | Zhang | H01M 10/44 |
| 10,014,706 | B2 * | 7/2018 | Loonen | H01M 10/448 |
| 10,044,204 | B2 * | 8/2018 | Hu | H02J 7/02 |
| 10,044,217 | B2 * | 8/2018 | Huang | H02J 7/02 |
| 10,084,333 | B2 * | 9/2018 | Zeng | H02J 7/007 |
| 10,090,700 | B2 * | 10/2018 | Zhang | H02J 7/02 |
| 10,097,022 | B2 * | 10/2018 | Li | H02J 7/00036 |
| 10,097,032 | B2 * | 10/2018 | Hu | H02J 7/00038 |
| 10,116,351 | B2 * | 10/2018 | Kim | H04B 3/46 |
| 10,122,190 | B2 * | 11/2018 | Zhang | H02J 7/02 |
| 10,122,201 | B2 * | 11/2018 | Zhang | H02J 7/00712 |
| 10,128,677 | B2 * | 11/2018 | Tian | H02J 7/04 |
| 10,135,263 | B2 * | 11/2018 | Jung | H02J 7/00047 |
| 10,135,277 | B2 * | 11/2018 | Heo | H01M 10/441 |
| 10,141,766 | B2 * | 11/2018 | Zhang | H02J 7/0047 |
| 10,148,096 | B2 * | 12/2018 | Muratov | H02J 7/04 |
| 10,148,113 | B2 * | 12/2018 | Zhang | H02J 7/0071 |
| 10,181,745 | B2 * | 1/2019 | Zhang | H02M 3/33523 |
| 10,186,881 | B2 * | 1/2019 | York | H02J 7/00 |
| 10,193,368 | B2 * | 1/2019 | Zhang | H02M 1/44 |
| 10,211,655 | B2 * | 2/2019 | Wu | H02J 7/0031 |
| 10,211,659 | B2 * | 2/2019 | Tian | H02J 7/00714 |
| 10,211,661 | B2 * | 2/2019 | Kim | G01R 31/385 |
| 10,231,754 | B2 * | 3/2019 | Shipp | A61B 17/0218 |
| 10,256,652 | B2 * | 4/2019 | Zhang | H02J 7/0042 |
| 10,270,269 | B2 * | 4/2019 | Zhang | H04M 19/08 |
| 10,277,053 | B2 * | 4/2019 | Zhang | H02J 7/06 |
| 10,291,043 | B2 * | 5/2019 | Zhang | H02J 7/0042 |
| 10,291,050 | B2 * | 5/2019 | Zhang | H02J 7/04 |
| 10,291,060 | B2 * | 5/2019 | Tian | H02M 3/33507 |
| 10,320,206 | B2 * | 6/2019 | Zhang | H01R 31/06 |
| 10,320,225 | B2 * | 6/2019 | Tian | H02M 3/33523 |
| 10,326,291 | B2 * | 6/2019 | Zhang | H02J 7/04 |
| 10,326,297 | B2 * | 6/2019 | Zhang | H02J 7/007182 |
| 10,333,326 | B2 * | 6/2019 | Xiao | H02J 7/00 |
| 10,333,331 | B2 * | 6/2019 | Zhang | H02J 7/0044 |
| 10,340,717 | B2 * | 7/2019 | Zhang | H02J 7/00712 |
| 10,340,718 | B2 * | 7/2019 | Zhang | H02J 7/0044 |
| 10,340,727 | B2 * | 7/2019 | Zhang | H02J 7/007182 |
| 10,348,119 | B2 * | 7/2019 | Tian | H02M 1/44 |
| 10,348,121 | B2 * | 7/2019 | Zhang | H02J 7/0013 |
| 10,367,365 | B2 * | 7/2019 | Wu | H02J 7/00034 |
| 10,381,860 | B2 * | 8/2019 | Tian | H02J 7/007188 |
| 10,381,861 | B2 * | 8/2019 | Zhang | H02J 7/0071 |
| 10,389,153 | B2 * | 8/2019 | Liao | H02J 7/0068 |
| 10,389,164 | B2 * | 8/2019 | Tian | H02M 1/08 |
| 10,404,083 | B2 * | 9/2019 | Zhang | H02J 7/02 |
| 10,411,490 | B2 * | 9/2019 | Melgar | H02J 7/00 |
| 10,411,494 | B2 * | 9/2019 | Tian | H02M 7/06 |
| 10,411,496 | B2 * | 9/2019 | Zhang | H02J 7/007182 |
| 10,424,953 | B2 * | 9/2019 | Zeng | H02J 7/02 |
| 10,424,954 | B2 * | 9/2019 | Zhang | H04B 3/54 |
| 10,424,958 | B2 * | 9/2019 | Tian | H01M 10/44 |
| 10,454,288 | B2 * | 10/2019 | Zhang | H02J 7/0045 |
| 10,461,549 | B2 * | 10/2019 | Hu | H02J 7/00 |
| 10,461,550 | B2 * | 10/2019 | Zeng | H02J 7/007 |
| 10,461,568 | B2 * | 10/2019 | Zhang | H01M 10/425 |
| 10,468,891 | B2 * | 11/2019 | Wan | A47L 9/2873 |
| 10,491,030 | B2 * | 11/2019 | Tian | H02J 7/007182 |
| 10,505,380 | B2 * | 12/2019 | Zhang | H04W 24/02 |
| 10,516,290 | B2 * | 12/2019 | Zhang | H04M 19/00 |
| 10,536,006 | B2 * | 1/2020 | Zhang | H02J 7/0014 |
| 10,541,553 | B2 * | 1/2020 | Tian | H02J 7/06 |
| 10,554,067 | B2 * | 2/2020 | Zhang | H02J 7/00 |
| 10,566,827 | B2 * | 2/2020 | Tian | H02J 7/06 |
| 10,566,828 | B2 * | 2/2020 | Tian | H02M 1/44 |
| 10,566,829 | B2 * | 2/2020 | Tian | H02J 7/06 |
| 10,574,074 | B2 * | 2/2020 | Jung | G06F 1/26 |
| 10,581,262 | B2 * | 3/2020 | Tian | H02J 7/0071 |
| 10,581,264 | B2 * | 3/2020 | Tian | H02J 7/06 |
| 10,622,821 | B2 * | 4/2020 | Chen | H02J 7/007192 |
| 10,622,829 | B2 * | 4/2020 | Zhang | H02J 7/02 |
| 10,630,096 | B2 * | 4/2020 | Zhang | H02J 7/0071 |
| 10,637,276 | B2 * | 4/2020 | Tian | H02M 3/33592 |
| 10,644,529 | B2 * | 5/2020 | Tian | H02J 7/00714 |
| 10,644,530 | B2 * | 5/2020 | Tian | H02M 5/04 |
| 10,651,677 | B2 * | 5/2020 | Chen | H02M 7/217 |
| 10,658,854 | B2 * | 5/2020 | Zhang | H02J 7/0034 |
| 10,666,072 | B2 * | 5/2020 | Zhang | H02J 7/00036 |
| 10,673,261 | B2 * | 6/2020 | Zeng | H04M 19/08 |
| 10,680,460 | B2 * | 6/2020 | Zhang | H02J 7/0042 |
| 10,707,688 | B2 * | 7/2020 | Kang | H01R 31/065 |
| 10,714,963 | B2 * | 7/2020 | Tian | H02J 7/06 |
| 10,727,679 | B2 * | 7/2020 | Zhang | H02J 7/00036 |
| 10,727,687 | B2 * | 7/2020 | Zhang | H02J 7/04 |
| 10,749,371 | B2 * | 8/2020 | Zhang | H02M 3/33507 |
| 10,751,086 | B2 * | 8/2020 | Shipp | A61B 17/22031 |
| 10,819,124 | B2 * | 10/2020 | Li | H02J 7/007184 |
| 10,819,246 | B2 * | 10/2020 | Tian | H02J 7/02 |
| 10,840,815 | B2 * | 11/2020 | Tian | H02M 1/32 |
| 10,998,734 | B2 * | 5/2021 | Zhang | H02J 7/00 |
| 10,998,735 | B2 * | 5/2021 | Chien | G09F 23/00 |
| 11,233,416 | B2 * | 1/2022 | Tian | H02J 7/0045 |
| 11,251,712 | B2 * | 2/2022 | Tian | H02M 1/36 |
| 11,329,493 | B2 * | 5/2022 | Tian | G01R 19/16542 |
| 11,469,609 | B2 * | 10/2022 | Tian | H02M 7/00 |
| 11,621,568 | B2 * | 4/2023 | Xiao | H02J 7/00 |
| | | | | 320/107 |
| 11,791,651 | B2 * | 10/2023 | Tian | H02J 7/0071 |
| | | | | 320/106 |
| 12,308,672 | B2 * | 5/2025 | Xiao | G01R 19/30 |
| 2001/0045813 | A1 * | 11/2001 | Suzuki | H02J 7/00047 |
| | | | | 320/110 |

(56) References Cited

U.S. PATENT DOCUMENTS

2002/0032537 A1* 3/2002 Hunter .................. G11C 29/56 702/117
2002/0117993 A1* 8/2002 Dias .................... H01M 10/425 320/106
2003/0005372 A1* 1/2003 Hsiao ..................... G11C 29/56 714/718
2003/0054703 A1* 3/2003 Fischer ................. H02J 7/0042 439/894
2003/0189417 A1* 10/2003 Dias .................... H02J 7/00036 320/134
2004/0000891 A1* 1/2004 Raichle ............... H02J 7/00036 320/107
2004/0000893 A1* 1/2004 Raichle ................. H02J 7/0069 320/135
2004/0095020 A1* 5/2004 Kernahan ............. H02M 3/156 307/35
2004/0225192 A1* 11/2004 Young ................ A61B 17/3439 600/204
2005/0057098 A1* 3/2005 Bouchon .................. B60K 6/46 180/65.245
2005/0115437 A1* 6/2005 Jennings, III ........... F42D 1/055 320/124
2005/0151505 A1* 7/2005 Dias .................... H02J 7/00047 320/106
2005/0189908 A1* 9/2005 Guthrie ..................... H02J 7/00 320/107
2006/0284595 A1* 12/2006 Hsieh .................. H02J 7/00712 320/115
2006/0284599 A1* 12/2006 Hsieh .................... H02J 7/0071 320/128
2007/0075680 A1 4/2007 Chung et al.
2007/0075683 A1* 4/2007 Chung .................. H02J 7/0068 320/128
2007/0159135 A1 7/2007 Teraoka
2007/0236181 A1* 10/2007 Palladino ............. G01R 31/379 320/130
2007/0278990 A1* 12/2007 Raichle ..................... H02J 7/02 320/104
2007/0278999 A1* 12/2007 Hsia .......................... H02J 7/00 320/111
2008/0042616 A1* 2/2008 Monks .................... H04L 12/10 320/106
2008/0157924 A1* 7/2008 Batra ............... G06K 19/07749 340/636.1
2008/0224669 A1* 9/2008 Nishida ................. H01M 10/44 320/165
2008/0272741 A1* 11/2008 Kanamori ................. H02J 7/00 320/137
2008/0303479 A1* 12/2008 Park .................... H02J 7/00304 320/108
2009/0085528 A1* 4/2009 Yamada ................ H01M 10/44 320/160
2009/0130874 A1* 5/2009 Englund ................ H01R 29/00 439/131
2009/0146892 A1* 6/2009 Shimizu ............. G06K 19/0726 307/104
2009/0167252 A1* 7/2009 Abe .......................... H02J 7/04 320/152
2009/0206796 A1* 8/2009 Pacholok .................. H02J 7/02 320/145
2009/0206800 A1* 8/2009 Kudou ............... H01R 13/6205 439/40
2009/0309547 A1* 12/2009 Nakatsuji ............ H01M 10/441 320/164
2010/0102774 A1* 4/2010 Guthrie ..................... H02J 7/00 320/107
2010/0153039 A1* 6/2010 Raichle ............ H02J 7/007194 702/63
2010/0225269 A1* 9/2010 Liu ......................... H02J 7/342 320/134
2010/0268178 A1* 10/2010 Young .............. A61B 17/22031 604/317
2010/0293302 A1* 11/2010 Fujii ................... G06F 13/4081 710/16
2010/0298029 A1* 11/2010 Jang ........................ G06F 1/266 713/340
2010/0320973 A1* 12/2010 Nishida ............. H02J 7/007182 320/145
2011/0000726 A1* 1/2011 Tanaka .................... B60L 53/51 180/65.265
2011/0181110 A1* 7/2011 Walley .................... H02J 50/12 363/52
2012/0087078 A1* 4/2012 Medica .................. H02J 7/342 361/679.41
2012/0210146 A1* 8/2012 Lai .......................... G06F 1/263 713/310
2012/0309295 A1* 12/2012 Maguire ................ H02J 50/80 455/39
2013/0147433 A1* 6/2013 Chen ................... H02J 7/00712 320/112
2013/0238819 A1* 9/2013 Oljaca ................. G06F 13/4081 710/313
2013/0241469 A1* 9/2013 Ono ........................ H02J 7/485 320/107
2013/0274758 A1* 10/2013 Young ................ A61B 17/0218 606/114
2013/0285599 A1* 10/2013 Hao ...................... H02J 7/0071 320/150
2013/0314040 A1* 11/2013 Tanaka .................... B60L 53/18 320/109
2014/0049209 A1* 2/2014 Chang ..................... G06F 1/266 320/107
2014/0081493 A1* 3/2014 Shemyakin ............. B60L 15/00 701/22
2014/0113561 A1* 4/2014 Maguire .................. H04B 5/79 455/41.2
2014/0136863 A1* 5/2014 Fritchman ................. H02J 7/00 713/310
2014/0145675 A1* 5/2014 Shimizu ................... H04B 5/79 320/108
2014/0180015 A1* 6/2014 Shipp ..................... A61B 17/34 600/204
2014/0223037 A1* 8/2014 Minoo ................ G06F 11/3051 710/16
2014/0254050 A1* 9/2014 Haines ..................... H02H 3/16 361/42
2014/0257119 A1* 9/2014 LeMay .................. A61B 5/308 600/509
2014/0285109 A1* 9/2014 Liao .................. H05B 45/3725 315/291
2014/0300321 A1* 10/2014 Kim ...................... H02J 7/0048 320/137
2014/0362609 A1* 12/2014 Bisschop .......... H02M 3/33523 363/21.12
2014/0365792 A1* 12/2014 Yun ....................... G06F 1/3212 713/320
2015/0002079 A1* 1/2015 Jeong .................. H02J 7/00047 320/160
2015/0008749 A1* 1/2015 Rhee ...................... H01R 29/00 307/80
2015/0021629 A1* 1/2015 Gershowitz ............ H05B 47/19 257/88
2015/0022088 A1* 1/2015 Gershowitz ............. F21V 23/02 362/249.02
2015/0022101 A1* 1/2015 Gershowitz .......... H05B 45/375 315/186
2015/0035477 A1* 2/2015 Wong ...................... G06F 1/266 320/165
2015/0054406 A1* 2/2015 Gershowitz ............... F21K 9/20 315/291
2015/0061578 A1* 3/2015 Keeling ................ B60L 53/124 320/108
2015/0123597 A1* 5/2015 Son ....................... G06F 1/3234 320/134
2015/0130417 A1* 5/2015 Song ................. H02J 7/007184 320/112
2015/0137791 A1* 5/2015 Remple .................. G01N 27/00 324/76.11

(56) References Cited

U.S. PATENT DOCUMENTS

2015/0145415 A1* 5/2015 Gershowitz ............ H05B 45/56 315/186
2015/0155729 A1* 6/2015 Lee ........................ H02J 7/0044 320/114
2015/0180244 A1* 6/2015 Jung ................... H02J 7/00047 320/137
2015/0194839 A1* 7/2015 Wojcik .................... H02J 50/80 320/108
2015/0236528 A1* 8/2015 Kim ....................... G01R 17/00 320/137
2015/0236547 A1* 8/2015 Davis ........................ H02J 7/04 320/111
2015/0263550 A1* 9/2015 Han ...................... H02J 7/0013 320/108
2015/0301552 A1* 10/2015 Lim .......................... H02J 7/00 374/152
2015/0340879 A1* 11/2015 Chu ........................ H02J 50/80 455/573
2015/0357836 A1* 12/2015 Zhao ......................... H02J 7/00 320/162
2015/0372521 A1* 12/2015 Lin ....................... H02J 7/0047 320/107
2015/0377466 A1* 12/2015 Gershowitz ............ H05B 45/46 362/382
2016/0028255 A1* 1/2016 Nishikawa ............ H01M 10/44 320/162
2016/0030081 A1* 2/2016 Shipp ................. A61B 17/0218 600/204
2016/0043585 A1* 2/2016 Zawadzki ............. H02J 7/0068 320/137
2016/0043586 A1* 2/2016 Wang ........................ H02J 7/00 320/137
2016/0043650 A1* 2/2016 Walley ...................... G06F 1/26 363/13
2016/0068073 A1* 3/2016 Taylor ..................... B60L 53/11 320/109
2016/0085283 A1* 3/2016 Tsutsui .................... G06F 1/165 713/300
2016/0098046 A1* 4/2016 Jutras ..................... H05B 47/19 323/318
2016/0105038 A1* 4/2016 Chi ..................... H02J 7/00036 320/107
2016/0117274 A1* 4/2016 Waters .................... G06F 1/266 710/106
2016/0118815 A1* 4/2016 Kanou .................. G06F 1/1632 320/138
2016/0118824 A1* 4/2016 Han ...................... H02J 7/0013 320/114
2016/0126758 A1* 5/2016 Wu ....................... H02J 7/0029 320/162
2016/0149493 A1* 5/2016 An ...................... H02M 3/1588 323/235
2016/0209347 A1* 7/2016 Kim ......................... H04B 3/46
2016/0218535 A1* 7/2016 Prete ..................... H02J 7/0013
2016/0255690 A1* 9/2016 Gershowitz ............ H05B 45/46 315/186
2016/0301226 A1* 10/2016 Matsumura ........... H02J 7/0029
2016/0336779 A1* 11/2016 Hu ............................ H02J 7/00
2016/0344210 A1* 11/2016 Zhang ................... H02J 7/0047
2016/0344211 A1* 11/2016 Zhang ....................... H02J 7/02
2016/0344218 A1* 11/2016 Zhang ..................... H02M 1/44
2016/0352132 A1* 12/2016 Zhang .................. H02J 7/0042
2016/0359340 A1* 12/2016 Zhao ..................... H02J 7/0045
2016/0370835 A1* 12/2016 Erickson ............. G06F 13/4282
2016/0372963 A1* 12/2016 Sankar .............. H02J 7/007182
2017/0040804 A1* 2/2017 Hu ...................... H02J 7/00714
2017/0040805 A1* 2/2017 Huang ...................... H02J 7/02
2017/0040810 A1* 2/2017 Hu ............................ H02J 7/00
2017/0040812 A1* 2/2017 Li ....................... H02J 7/00714
2017/0040813 A1* 2/2017 Hu ............................ H02J 7/02
2017/0040814 A1* 2/2017 Hu ...................... H02J 7/00714
2017/0040817 A1* 2/2017 Hu .................... H02J 7/007182
2017/0040821 A1* 2/2017 Li ....................... H02J 7/00047
2017/0047852 A1* 2/2017 Huang .................... H02M 3/00
2017/0054286 A9* 2/2017 Haines .................. G01R 31/54
2017/0085109 A1* 3/2017 Zhang ..................... H02J 7/865
2017/0093189 A1* 3/2017 Zeng ......................... H02J 7/02
2017/0098942 A1* 4/2017 Zeng ......................... H02J 7/00
2017/0098944 A1* 4/2017 Zhang ....................... H02J 7/00
2017/0117728 A1* 4/2017 Zhang .................. H04M 19/08
2017/0117735 A1* 4/2017 Liao ..................... H02J 7/0068
2017/0136902 A1* 5/2017 Ricci ....................... B60L 53/38
2017/0149252 A1* 5/2017 Zhang .................. H02J 7/0045
2017/0194798 A1* 7/2017 Tian ..................... H02J 7/0071
2017/0194799 A1* 7/2017 Tian ..................... H02J 7/0036
2017/0194805 A1* 7/2017 Kong ................... H02J 7/0045
2017/0207648 A1* 7/2017 Xiao ......................... H02J 7/00
2017/0222459 A1* 8/2017 Kang ................... H02J 7/0042
2017/0237273 A1* 8/2017 Zhang ....................... H02J 7/04 320/114
2017/0244264 A1* 8/2017 Zhang .................. H02J 7/0034
2017/0244265 A1* 8/2017 Zhang .................. H01M 10/44
2017/0250555 A1* 8/2017 Zhang .................. H02J 7/0042
2017/0256961 A1* 9/2017 Zeng ................. G01R 31/3842
2017/0258493 A1* 9/2017 Shipp .............. A61B 17/22031
2017/0271887 A1* 9/2017 Heo .................... G01R 31/396
2017/0279286 A1* 9/2017 Zhang .................. H02J 7/0042
2017/0279295 A1* 9/2017 Wojcik .................. H04Q 11/00
2017/0338667 A1* 11/2017 Loonen ............. H01M 10/0525
2018/0034287 A1* 2/2018 Johnson, Jr. ............. H02J 7/04
2018/0034311 A1* 2/2018 Zhang .................. H04M 19/00
2018/0046591 A1* 2/2018 Waters ................ G06F 13/4282
2018/0054589 A1* 2/2018 Park ...................... G09G 5/008
2018/0069418 A1* 3/2018 Tian ....................... H02M 1/44
2018/0083477 A1* 3/2018 Tian ................... H01M 10/425
2018/0090946 A1* 3/2018 Melgar .................... H02J 7/00
2018/0102667 A1* 4/2018 Choi ....................... H04B 5/79
2018/0131195 A1* 5/2018 Wu .................... H02J 7/00034
2018/0138724 A1* 5/2018 Hu ................... H02J 7/007182
2018/0145517 A1* 5/2018 Krishna ........... H02J 7/007182
2018/0145533 A1* 5/2018 Tian ................. H02M 3/33576
2018/0166889 A1* 6/2018 Xu .......................... H02J 7/007
2018/0175637 A1* 6/2018 Zhang .................. H02J 7/0068
2018/0205322 A1* 7/2018 Walley ................... H02J 50/80
2018/0241238 A1* 8/2018 Zhang ....................... H02J 7/04
2018/0254711 A1* 9/2018 Zhang .................. H04M 19/00
2018/0262042 A1* 9/2018 Tian ................. H02M 3/33576
2018/0269697 A1* 9/2018 Zhang ................. H02J 7/00712
2018/0269700 A1* 9/2018 Tian .................... H02J 7/00714
2018/0278070 A1* 9/2018 Zhang ....................... H02J 7/02
2018/0358818 A1* 12/2018 Zhang ....................... H02J 7/04
2018/0358835 A1* 12/2018 Tian ................. H01M 10/0525
2018/0364291 A1* 12/2018 Zhang ............... H04M 1/72409
2019/0001828 A1* 1/2019 Ko ................... H01M 10/6571
2019/0020202 A1* 1/2019 Wan ..................... H02J 7/0049
2019/0036351 A1* 1/2019 Tian ..................... H02J 7/0071
2019/0036361 A1* 1/2019 Zhang ................. H02J 7/00036
2019/0089174 A1* 3/2019 Zeng ......................... H02J 7/02
2019/0089175 A1* 3/2019 Zhang .................. H01M 10/44
2019/0126761 A1* 5/2019 Verbridge ......... H01M 10/4207
2019/0157886 A1* 5/2019 Zhang ....................... H02J 7/00
2019/0209208 A1* 7/2019 Shipp .................. A61B 17/221
2019/0214833 A1* 7/2019 Li ....................... H02J 7/00718
2019/0214837 A1* 7/2019 Kristjansson ......... H02J 7/0068
2019/0252983 A1* 8/2019 Tian ................. H02M 3/33507
2019/0273442 A1* 9/2019 Tian ........................ H02H 9/00
2019/0273443 A1* 9/2019 Tian ....................... H02M 7/04
2019/0305573 A1* 10/2019 Xiao ......................... H02J 7/00
2019/0312446 A1* 10/2019 Zeng ......................... H02J 7/04
2019/0312454 A1* 10/2019 Tian ..................... H02M 7/217
2019/0341793 A1* 11/2019 Chien ................ F21V 33/0004
2019/0389314 A1* 12/2019 Zhu ......................... B60L 53/14
2019/0389315 A1* 12/2019 Zhu ......................... B60L 53/64
2020/0106285 A1* 4/2020 Tian ..................... H02J 7/0047
2020/0119574 A1* 4/2020 Wang ............... H02J 7/007184
2020/0136410 A1* 4/2020 Tian ..................... H02J 7/0047
2020/0144827 A1* 5/2020 Tian ........................... H02J 7/04
2020/0262303 A1* 8/2020 Dow ....................... B60L 50/66
2020/0274375 A1* 8/2020 Griffiths .................... H02J 7/24
2020/0412268 A1* 12/2020 Tian .................... H02M 7/1557

(56) References Cited

U.S. PATENT DOCUMENTS

| | | | | |
|---|---|---|---|---|
| 2021/0119458 A1* | 4/2021 | Zhang | H01M 10/486 |
| 2022/0094175 A1* | 3/2022 | Tian | H04M 19/00 |
| 2023/0283085 A1* | 9/2023 | Xiao | G01R 19/30<br>320/107 |

OTHER PUBLICATIONS

"Understanding Little and Big Endian Architecture" Krishan Kumar, cs-fundamentals.com, published online as dated by google Nov. 21, 2013, Accessed online Feb. 11, 2004, https://cs-fundamentals.com/c-programming/endianness-little-and-big-endian (Year: 2013).*
EPO, Communication for EP Application No. 15858612.3, Nov. 30, 2023.
USPTO, Notice of Allowance for U.S. Appl. No. 17/544,587, Aug. 21, 2023.
EPO, Communication for EP Application No. 15858612.3, Dec. 20, 2022.
KIPO, First Office Action for KR Application No. 10-2016-7035468, May 15, 2017.
KIPO, Second Office Action for KR Application No. 10-2016-7035468, Nov. 27, 2017.
KIPO, Notice of Allowance for KR application No. 10-2016-7035468, May 29, 2018.
USPTO, Non Final Rejection for U.S. Appl. No. 17/137,043, Jul. 8, 2022.
EPO, Communication Pursuant to Article 94(3) EPC issued in EP Application No. 21195275.9, May 28, 2026.

* cited by examiner

QUICK CHARGING METHOD, MOBILE TERMINAL, AND POWER ADAPTER

CROSS-REFERENCE TO RELATED APPLICATION(S)

This application is a continuation of U.S. application Ser. No. 17/544,587, filed on Dec. 7, 2021, which is a continuation of U.S. application Ser. No. 16/705,544, filed on Dec. 6, 2019, which is a continuation of U.S. application Ser. No. 15/405,610, filed on Jan. 13, 2017, which is a continuation of International Patent Application No. PCT/CN2016/070204, filed on Jan. 5, 2016. The entire disclosures of the aforementioned applications are incorporated herein by reference.

TECHNICAL FIELD

The present disclosure relates to the field of charging, and more particularly to a quick charging method, a mobile terminal, and a power adapter.

BACKGROUND

Presently, mobile terminals (e.g., smart phones) become more and more popular with consumers. However, the power consumption of mobile terminals is great, thus mobile terminals need to be charged frequently. As the battery capacity of mobile terminals becomes greater and greater, correspondingly, the charging time becomes longer. How to realize quick charging is a problem that needs to be solved instantly.

In the present technology, to achieve the purpose of quick charging, the output current of a power adapter is directly increased without consideration of endurance of a mobile terminal, which will result in a phenomenon of overheat or even burnout of the mobile terminal, and reduces the lifespan of the mobile terminal.

SUMMARY

The embodiments of the present disclosure provide a quick charging method, a power adaptor, and a mobile terminal, which can increase security of a quick charging process.

In a first aspect, a quick charging method is provided. The method is applied in a mobile terminal. The mobile terminal is coupled to a power adapter via a universal serial bus (USB) interface, a power line of the USB interface is used for charging a battery of the mobile terminal, and data lines of the USB interface are used for communication between the mobile terminal and the power adapter. The mobile terminal supports a normal charging mode and a quick charging mode, and a charging speed of the quick charging mode is greater than that of the normal charging mode. The method comprises: determining, by the mobile terminal, a type of the power adapter when it is determined that the power adapter is coupled to the mobile terminal; transmitting, by the mobile terminal, indication information to the power adapter when it is determined that the power adapter is a non-USB power adapter, the indication information being configured to indicate that the mobile terminal has recognized the type of the power adapter and instruct the power adapter to activate a quick charging communication process; receiving, by the mobile terminal, a first instruction from the power adapter after the power adapter activates the quick charging communication process, the first instruction being configured to query whether the mobile terminal agrees to charge the battery of the mobile terminal in the quick charging mode; transmitting, by the mobile terminal, a reply instruction of the first instruction to the power adapter, the reply instruction of the first instruction being configured to indicate that the mobile terminal agrees to charge the battery in the quick charging mode; conducting, by the mobile terminal, a handshake communication with the power adapter via a second instruction transmitted by the power adapter to determine a charging voltage of the quick charging mode; conducting, by the mobile terminal, a handshake communication with the power adapter via a third instruction transmitted by the power adapter to determine a charging current of the quick charging mode; and conducting, by the mobile terminal, a handshake communication with the power adapter via a fourth instruction transmitted by the power adapter when the power adapter adjusts an output voltage and an output current of the power adapter to be the charging voltage and the charging current of the quick charging mode and enters a constant current phase, so as to cause the power adapter to adjust the output current to charge the battery in a multi-stage constant current mode.

In a second aspect, a quick charging method is provided. The quick charging method is applied in a power adapter. The power adapter is coupled to a mobile terminal via a USB interface, a power line of the USB interface is used for the power adapter to charge a battery of the mobile terminal, and data lines of the USB interface are used for communication between the power adapter and the mobile terminal. The power adapter supports a normal charging mode and a quick charging mode, and a charging speed of the quick charging mode being greater than that of the normal charging mode. The method comprises: activating, by the power adapter, a quick charging communication process when the power adapter receives indication information for indicating that the mobile terminal has recognized a type of the power adapter from the mobile terminal, and transmitting, by the power adapter, a first instruction to the mobile terminal, the first instruction being configured to query whether the mobile terminal agrees to charge the battery in the quick charging mode; receiving, by the power adapter, a reply instruction of the first instruction from the mobile terminal, the reply instruction of the first instruction being configured to indicate that the mobile terminal agrees to charge the battery in the quick charging mode; conducting, by the power adapter, a handshake communication with the mobile terminal via a second instruction to determine a charging voltage of the quick charging mode; conducting, by the power adapter, a handshake communication with the mobile terminal via a third instruction to determine a charging current of the quick charging mode; and adjusting, by the power adapter, an output voltage and an output current of the power adapter to be the charging voltage and the charging current of the quick charging mode to enter a constant current phase; and conducting, by the power adapter, a handshake communication with the mobile terminal via a fourth instruction during the constant current phase to adjust the output current of the power adapter, so as to charge the mobile terminal in a multi-stage constant current mode.

In a third aspect, a mobile terminal is provided. The mobile terminal is coupled to a power adapter via a USB interface. A power line of the USB interface is used for charging a battery of the mobile terminal, and data lines of the USB interface are used for communication between the mobile terminal and the power adapter. The mobile terminal supports a normal charging mode and a quick charging mode, and a charging speed of the quick charging mode is greater than that of the normal charging mode. The mobile terminal comprises: a charging circuit; and a communication control circuit configured to determine a type of the power adapter when it is determined that the power adapter is coupled to the mobile terminal, transmit indication information to the power adapter when it is determined that the power adapter is a non-USB power adapter, wherein the indication information is configured to indicate that the mobile terminal has recognized the type of the power adapter and instruct the power adapter to activate a quick charging communication process. The communication control circuit is further configured to receive a first instruction from the power adapter after the power adapter activates the quick charging communication process, and the first instruction is configured to query whether the mobile terminal agrees to charge a battery of the mobile terminal in the quick charging mode. The communication control circuit is further configured to transmit a reply instruction of the first instruction to the power adapter, and the reply instruction of the first instruction is configured to indicate that the mobile terminal agrees to charge the battery in the quick charging mode. The communication control circuit is further configured to conduct a handshake communication with the power adapter via a second instruction transmitted by the power adapter to determine a charging voltage of the quick charging mode, conduct a handshake communication with the power adapter via a third instruction transmitted by the power adapter to determine a charging current of the quick charging mode, and conduct a handshake communication with the power adapter via a fourth instruction transmitted by the power adapter when the power adapter adjusts an output voltage and an output current of the power adapter to be the charging voltage and the charging current of the quick charging mode and enters a constant current phase, so as to cause the power adapter to adjust the output current to charge the battery in a multi-stage constant current mode via the charging circuit.

In a fourth aspect, a power adapter is provided. The power adapter is coupled to a mobile terminal via a USB interface. A power line of the USB interface is used for the power adapter to charge a battery of the mobile terminal, and data lines of the USB interface are used for communication between the power adapter and the mobile terminal. The power adapter supports a normal charging mode and a quick charging mode, and a charging speed of the quick charging mode is greater than that of the normal charging mode. The power adapter comprises a charging circuit and a communication control circuit. The communication control circuit is configured to activate a quick charging communication process when the power adapter receives indication information for indicating that the mobile terminal has recognized a type of the power adapter from the mobile terminal, and transmit a first instruction to the mobile terminal, wherein the first instruction is configured to query whether the mobile terminal agrees to charge the battery in the quick charging mode. The communication control circuit is further configured to receive a reply instruction of the first instruction from the mobile terminal, and the reply instruction of the first instruction is configured to indicate that the mobile terminal agrees to charge the battery in the quick charging mode. The communication control circuit is further configured to conduct a handshake communication with the mobile terminal via a second instruction to determine a charging voltage of the quick charging mode, conduct a handshake communication with the mobile terminal via a third instruction to determine a charging current of the quick charging mode, adjust an output voltage and an output current of the power adapter to be the charging voltage and the charging current of the quick charging mode to enter a constant current phase, and conduct a handshake communication with the mobile terminal via a fourth instruction during the constant current phase to adjust the output current of the power adapter, so as to charge the mobile terminal in a multi-stage constant current mode via the charging circuit.

In embodiments of the present disclosure, the power adapter does not increase the charging current blindly to implement quick charging, but negotiates with the mobile terminal via the bidirectional communication with the mobile terminal to determine whether or not the quick charging mode can be adopted. Comparing with the present technology, the security of the quick charging process is improved.

BRIEF DESCRIPTION OF DRAWINGS

To better illustrate the technical solution of embodiments of the present disclosure, the following descriptions will briefly illustrate the accompanying drawings described in the embodiments. Obviously, the following described accompanying drawings are some embodiments of the present disclosure. Those skilled in the art can obtain other accompanying drawings according to the described accompanying drawings without creative work.

DETAILED DESCRIPTION

Figure 1:
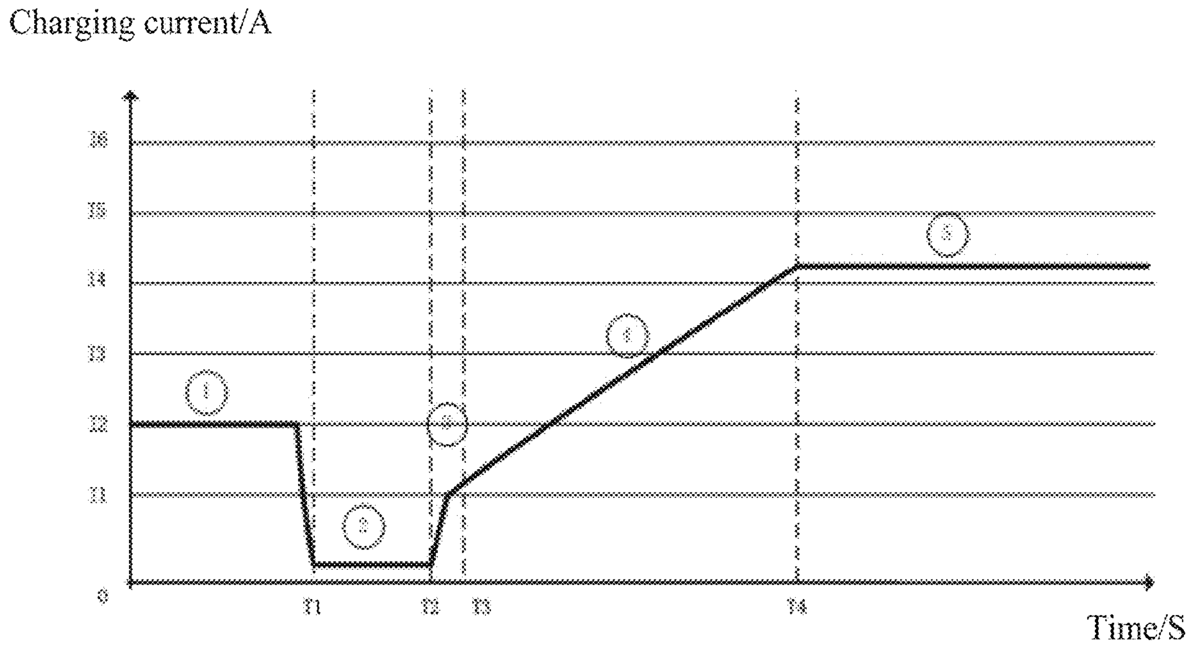
FIG. 1 is a schematic diagram of a quick charging process in accordance with an embodiment of the present disclosure.
Figure 2:
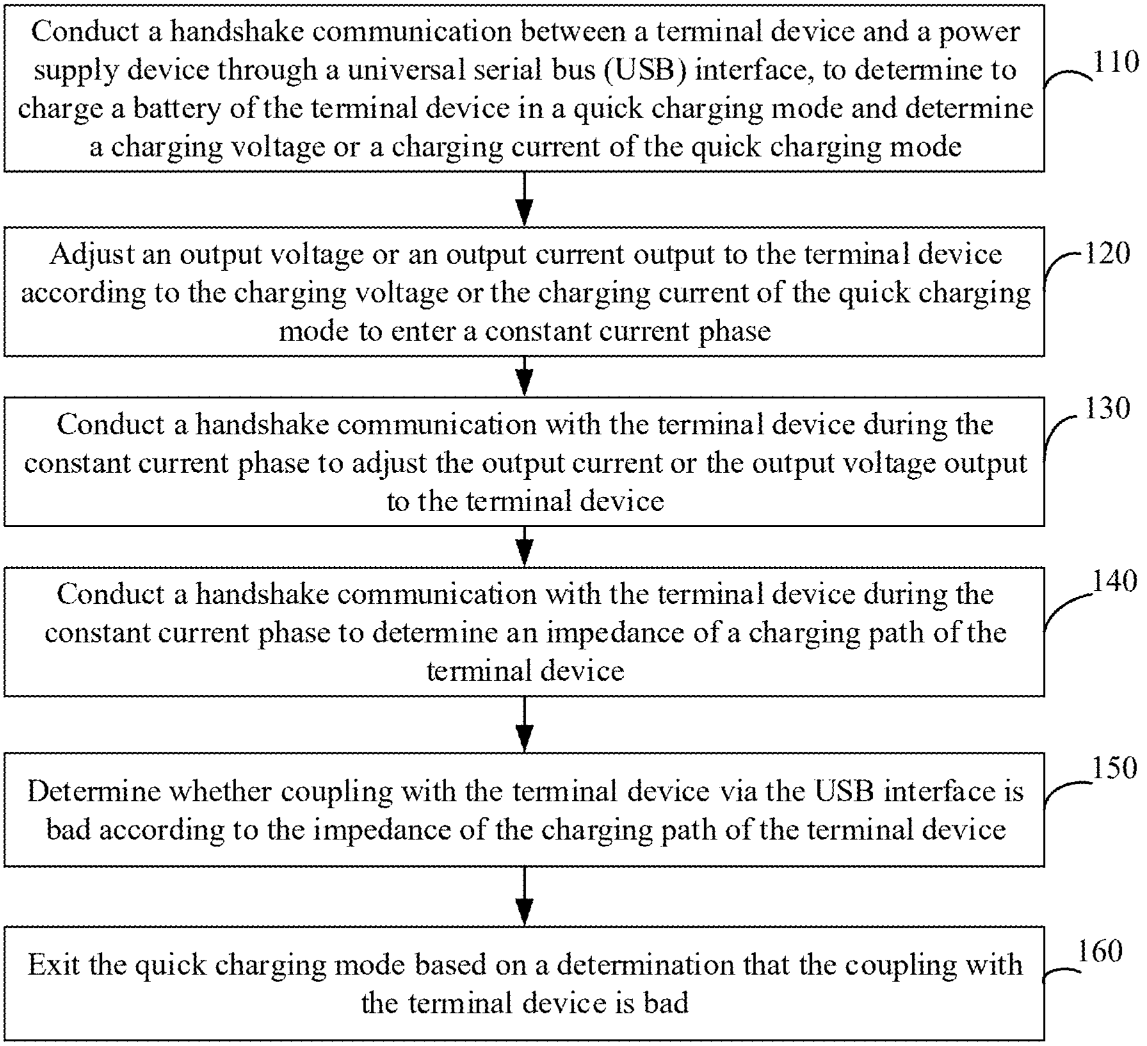
FIG. 2 is a schematic flow chart of a quick charging method in accordance with an embodiment of the present disclosure.
Figure 3:
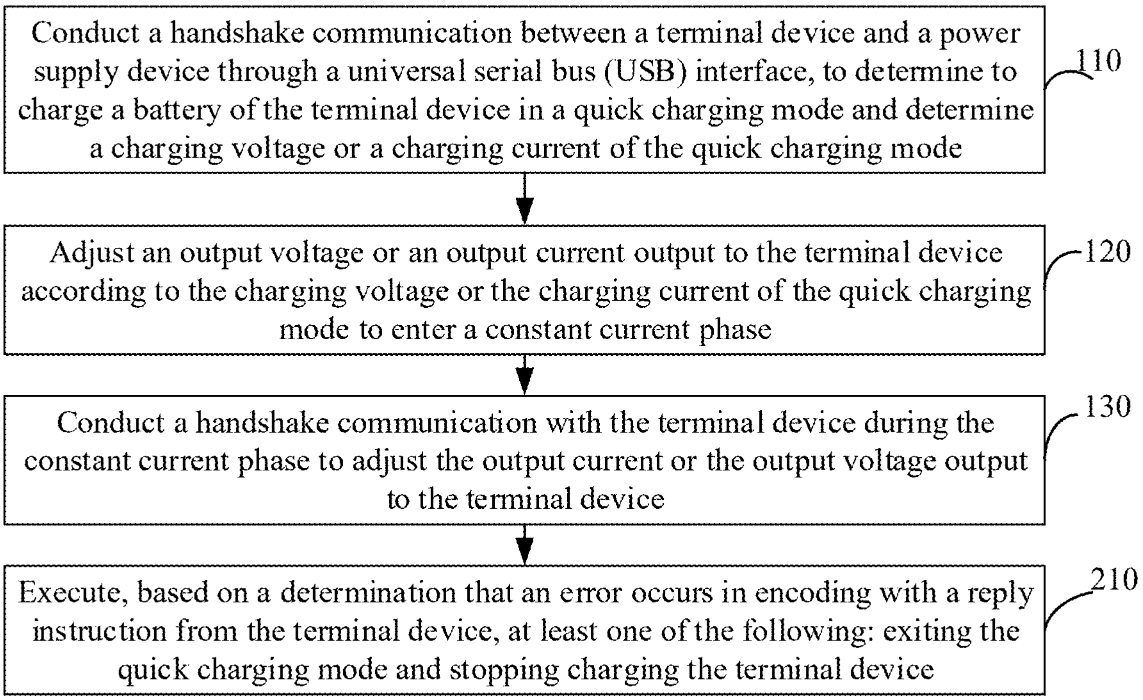
FIG. 3 is a schematic flow chart of a quick charging method in accordance with an embodiment of the present disclosure.
Figure 4:
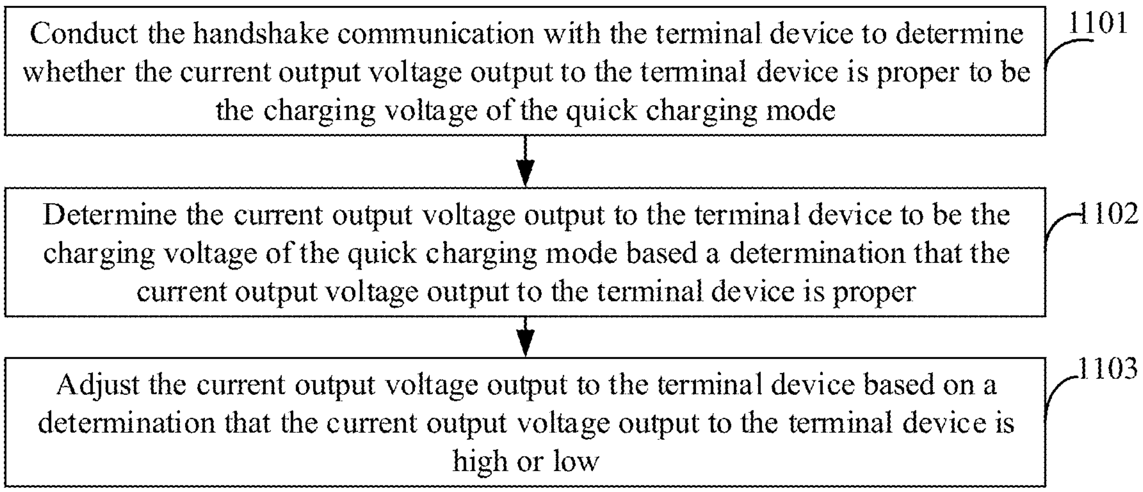
FIG. 4 is a schematic flow chart illustrating detailed operations of block 110 of FIG. 2 and FIG. 3.
Figure 5:
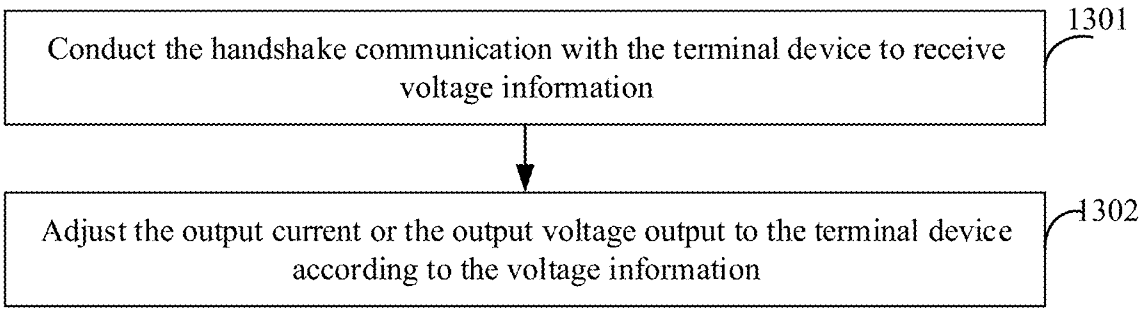
FIG. 5 is a schematic flow chart illustrating detailed operations of block 130 of FIG. 2 and FIG. 3.
Figure 6:
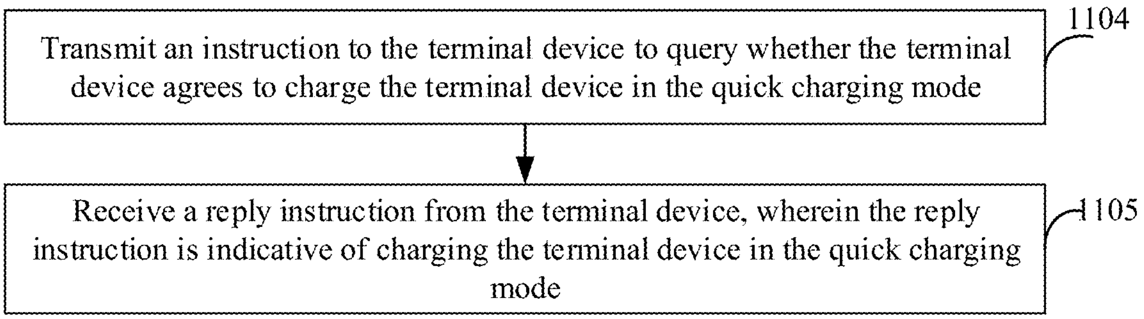
FIG. 6 is a schematic flow chart illustrating detailed operations of block 110 of FIG. 2 and FIG. 3.
Figure 7:
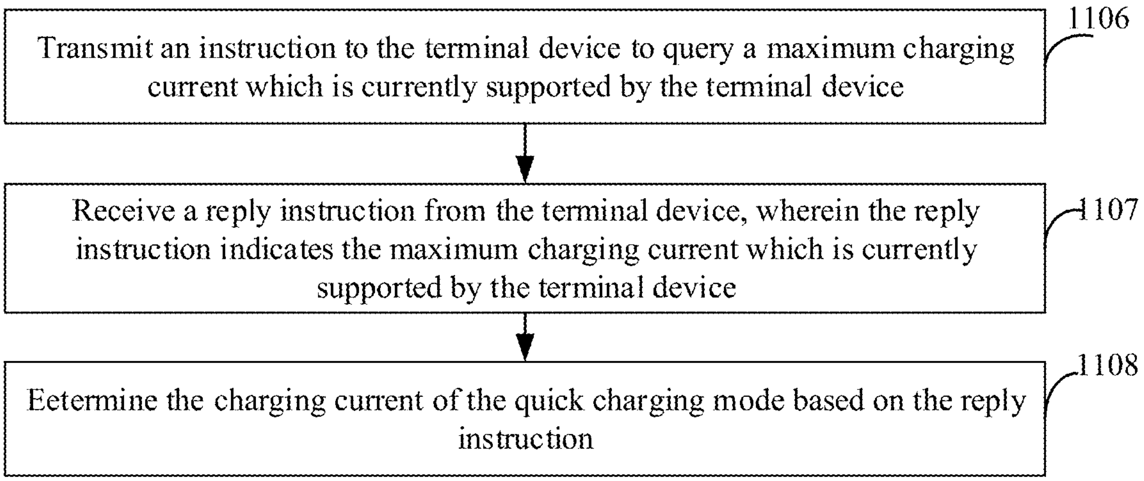
FIG. 7 is a schematic flow chart illustrating detailed operations of block 110 of FIG. 2 and FIG. 3.
Figure 8:
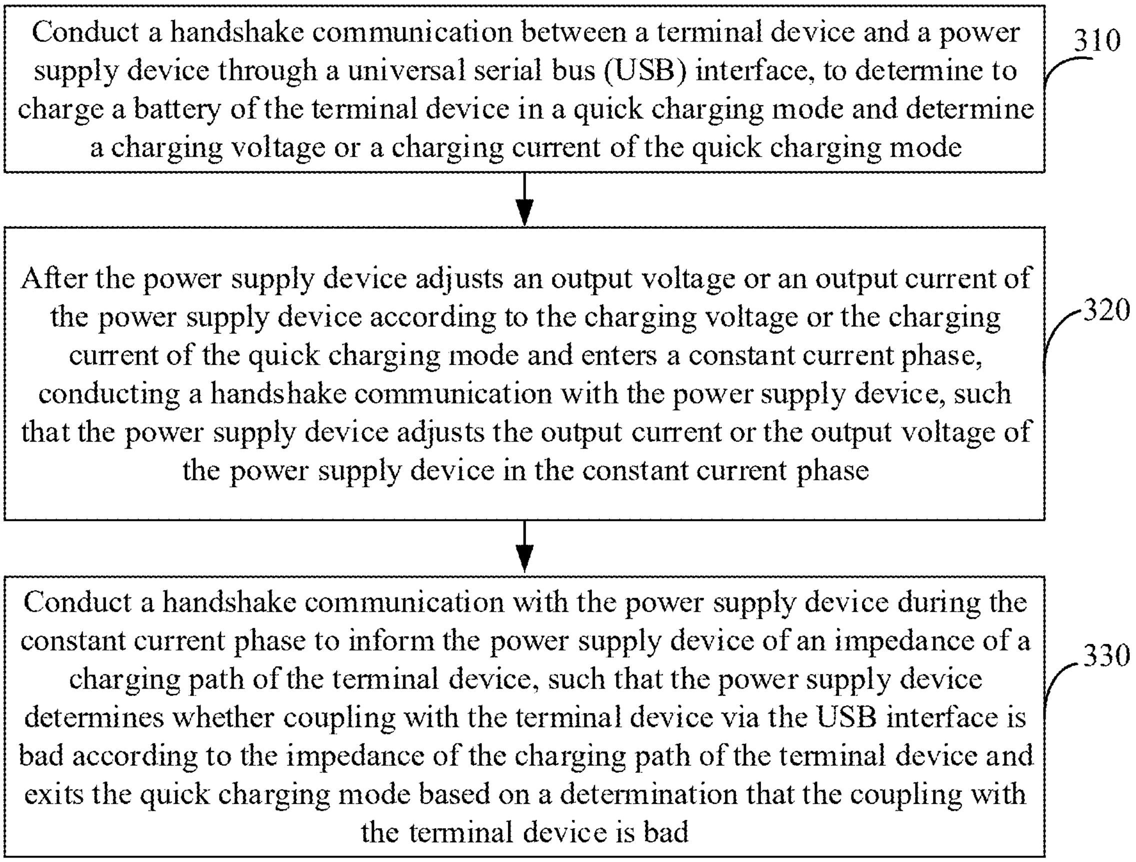
FIG. 8 is a schematic flow chart of a quick charging method in accordance with an embodiment of the present disclosure.
Figure 9:
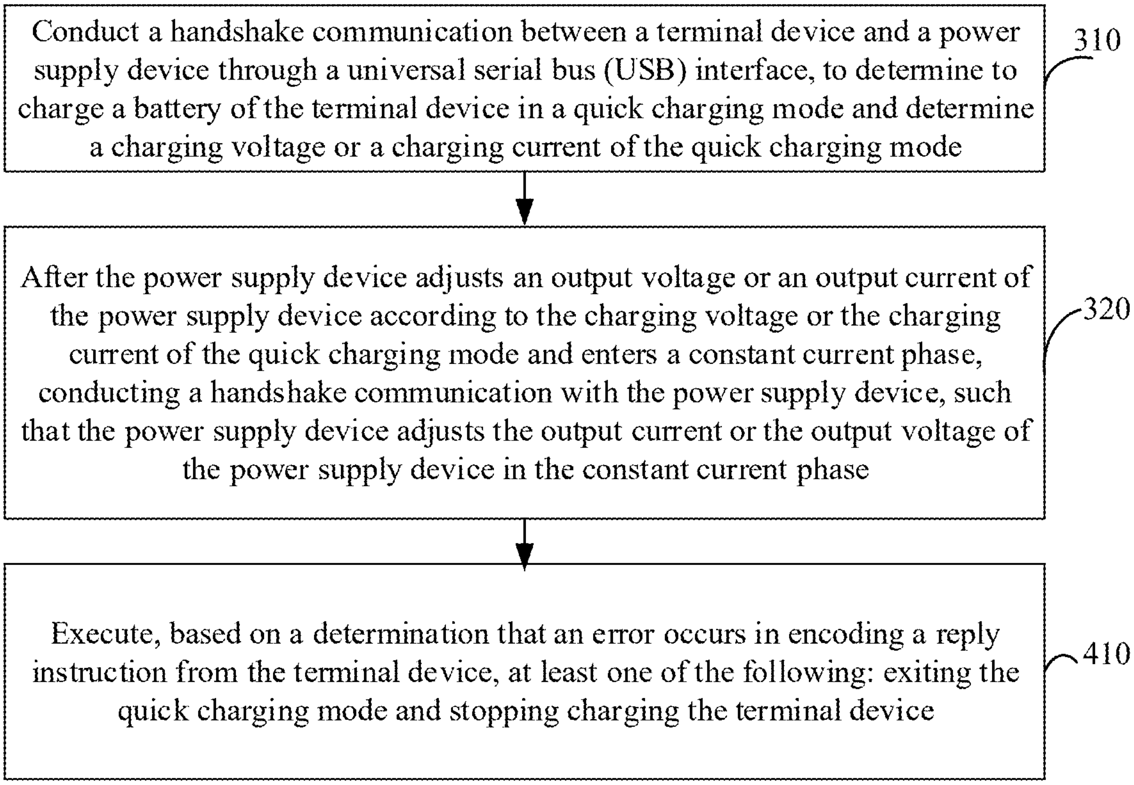
FIG. 9 is a schematic flow chart of a quick charging method in accordance with an embodiment of the present disclosure.
Figure 10:
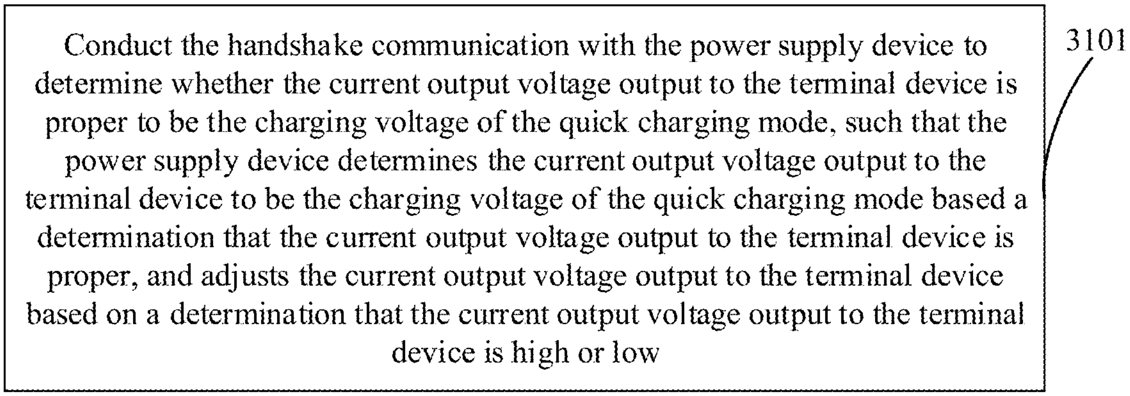
FIG. 10 is a schematic flow chart illustrating a detailed operation of block 310 of FIG. 8 and FIG. 9.

In combination with the first aspect, in an implementation manner of the first aspect, the reply instruction of the first instruction comprises multiple bits, and the multiple bits comprise a bit configured to indicate whether the mobile terminal agrees to activate the quick charging mode, and a bit configured to indicate a path impedance of the mobile terminal. The path impedance of the mobile terminal is used for the power adapter to determine whether the USB interface is in good contact.

In combination with the first aspect or any of the above implementation manners, in another implementation manner of the first aspect, a format of the reply instruction of the first instruction is 101XYYYYYY, X indicates 1 bit, Y indicates 1 bit, X=1 indicates that the mobile terminal agrees to activate the quick charging mode, X=0 indicates that the mobile terminal disagrees to activate the quick charging mode, and the path impedance of the mobile terminal equals to YYYYYY*5mΩ.

In combination with the first aspect or any of the above implementation manners, in another implementation manner of the first aspect, the first instruction is 10101000 or 0xA8.

In combination with the first aspect or any of the above implementation manners, in another implementation manner of the first aspect, conducting, by the mobile terminal, the handshake communication with the power adapter via the second instruction transmitted by the power adapter to determine the charging voltage of the quick charging mode comprises: receiving, by the mobile terminal, the second instruction from the power adapter, the second instruction being configured to query whether the current output voltage of the power adapter is proper to be the charging voltage of the quick charging mode; and transmitting, by the mobile terminal, a reply instruction of the second instruction to the power adapter, the reply instruction of the second instruction being configured to indicate that the current output voltage of the power adapter is proper, high, or low, so as to cause the power adapter to determine the charging voltage of the quick charging mode according to the reply instruction of the second instruction.

In combination with the first aspect or any of the above implementation manners, in another implementation manner of the first aspect, a format of the reply instruction of the second instruction is 1010XX0000, X indicates 1 bit, XX=11 indicates that the current output voltage of the power adapter is proper, XX=10 indicates that the current output voltage of the power adapter is high, XX=01 indicates that the current output voltage of the power adapter is low.

In combination with the first aspect or any of the above implementation manners, in another implementation manner of the first aspect, the second instruction is 10100100 or 0xA4.

In combination with the first aspect or any of the above implementation manners, in another implementation manner of the first aspect, conducting, by the mobile terminal, the handshake communication with the power adapter via the third instruction transmitted by the power adapter to determine the charging current of the quick charging mode comprises: receiving, by the mobile terminal, the third instruction from the power adapter, the third instruction being configured to query a maximum charging current which is currently supported by the mobile terminal; and transmitting, by the mobile terminal, a reply instruction of the third instruction to the power adapter, the reply instruction of the third instruction being configured to indicate the maximum charging current which is currently supported by the mobile terminal, so as to cause the power adapter to determine the charging current of the quick charging mode according to the reply instruction of the third instruction.

In combination with the first aspect or any of the above implementation manners, in another implementation manner of the first aspect, the reply instruction of the third instruction comprises multiple bits, and the multiple bits of the reply instruction of the third instruction comprise a bit configured to indicate the maximum charging current which is currently supported by the mobile terminal.

In combination with the first aspect or any of the above implementation manners, in another implementation manner of the first aspect, a format of the reply instruction of the third instruction is 1010XXXXXX, X indicates 1 bit, and the maximum charging current which is currently supported by the mobile terminal equals to 3000+(XXXXXX*250) mA.

In combination with the first aspect or any of the above implementation manners, in another implementation manner of the first aspect, the third instruction is 10100110 or 0xA6.

In combination with the first aspect or any of the above implementation manners, in another implementation manner of the first aspect, conducting, by the mobile terminal, the handshake communication with the power adapter via the fourth instruction transmitted by the power adapter so as to cause the power adapter to adjust the current output current comprises: receiving, by the mobile terminal, the fourth instruction from the power adapter during the constant current phase, the fourth instruction being configured to query a current voltage of the battery of the mobile terminal; and transmitting, by the mobile terminal, a reply instruction of the fourth instruction for indicating the current voltage of the battery of the mobile terminal to the power adapter, so as to cause the power adapter to adjust the current output current of the power adapter according to the current voltage of the battery.

In combination with the first aspect or any of the above implementation manners, in another implementation manner of the first aspect, the reply instruction of the fourth instruction comprises multiple bits, and the multiple bits of the reply instruction of the fourth instruction comprise a bit configured to indicate the current voltage of the battery, and a bit configured to indicate whether the battery is being charged.

In combination with the first aspect or any of the above implementation manners, in another implementation manner of the first aspect, a format of the reply instruction of the fourth instruction is 101XYYYYYY, X indicates 1 bit, Y indicates 1 bit, X=1 indicates that the battery is being charged, X=0 indicates that the battery is not charged, the current voltage of the battery equals to 3404+(YYYYYY*16) mV.

In combination with the first aspect or any of the above implementation manners, in another implementation manner of the first aspect, the fourth instruction is 10100010 or 0xA2.

In combination with the first aspect or any of the above implementation manners, in another implementation manner of the first aspect, the method further comprises: transmitting, by the mobile terminal, information for indicating a path impedance of the mobile terminal to the power adapter, so as to cause the power adapter to determine whether the USB interface is in bad contact according to the path impedance during the constant current phase; and receiving, by the mobile terminal, a fifth instruction from the power adapter when the power adapter determines that the USB interface is in bad contact, the fifth instruction being configured to indicate that the USB interface is in bad contact and the power adapter is ready to exit the quick charging mode or reactivate the quick charging communication process.

In combination with the first aspect or any of the above implementation manners, in another implementation manner of the first aspect, the fifth instruction is 10110010 or 0xB2.

In combination with the first aspect or any of the above implementation manners, in another implementation manner of the first aspect, the method further comprises: executing, by the mobile terminal, at least one of following operations when the power adapter determines that a reply instruction received from the mobile terminal has an encoding error, and the following operations comprises: exiting the quick charging mode, stopping charging, or reactivating the quick charging communication process.

In combination with the first aspect or any of the above implementation manners, in another implementation manner of the first aspect, an instruction transmitted from the mobile terminal to the power adapter comprises multiple bits, before the mobile terminal transmits any instruction, the mobile terminal firstly transmits the most significant bit of multiple bits of the any instruction; or an instruction received from the power adapter by the mobile terminal comprises multiple bits, when the mobile terminal receives an instruction, the mobile terminal firstly receives the most significant bit of multiple bits of the instruction.

In combination with the first aspect or any of the above implementation manners, in another implementation manner of the first aspect, clock signals used in the communication between the power adapter and the mobile terminal are provided by the power adapter.

In combination with the first aspect or any of the above implementation manners, in another implementation manner of the first aspect, an instruction transmitted from the power adapter to the mobile terminal comprises multiple bits, during a process of transmitting each of the multiple bits, the power adapter firstly transmits each bit, and then transmits a clock interrupt signal; or a reply instruction received from the mobile terminal by the power adapter comprises multiple bits, during a process of receiving each of the multiple bits, the power adapter firstly transmits the clock interrupt signal, and then receives each bit after a preset time interval.

In combination with the first aspect or any of the above implementation manners, in another implementation manner of the first aspect, each instruction transmitted from the power adapter to the mobile terminal comprises an 8-bit data, the power adapter transmits the 8-bit data to the mobile terminal via eight continuous clock periods of the clock signal, level of previous 10 μs of each of the eight continuous clock periods is low level, and level of latter 500 μs of each of the eight continuous clock periods is high level; or each reply instruction received from the mobile terminal by the power adapter comprises a 10-bit data, the power adapter receives the 10-bit data from the mobile terminal via ten continuous clock periods of the clock signal, level of previous 500 μs of each of the ten continuous clock periods is high level, and level of latter 10 μs of each of the ten continuous clock periods is low level.

In combination with the first aspect or any of the above implementation manners, in another implementation manner of the first aspect, during a process that the power adapter receives an instruction from the mobile terminal, a minimum value of high level of the clock signal equals to VDD of the power adapter minus 0.7V; or during the process that the power adapter receives an instruction from the mobile terminal, a maximum value of low level of the clock signal is 0.8V; or during a process that the power adapter transmits an instruction to the mobile terminal, the minimum value of the high level of the clock signal equals to 0.25VDD+0.8V; or during the process that the power adapter transmits an instruction to the mobile terminal, a maximum value of the high level of the clock signal is 4.5V; or during the process that the power adapter transmits an instruction to the mobile terminal, the maximum value of the low level of the clock signal is 0.15VDD; the VDD is a work voltage of the power adapter, and/or the VDD is greater than 3.2V and less than 4.5V.

In combination with the first aspect or any of the above implementation manners, in another implementation manner of the first aspect, after the mobile terminal receives the clock interrupt signal, holding time of a data of an instruction transmitted from the power adapter to the mobile terminal is 500±5 μs.

In combination with the second aspect, in an implementation manner of the second aspect, the method further comprises: detecting, by the power adapter, a charging current provided to the mobile terminal by the power adapter; and determining, by the power adapter, that the mobile terminal has recognized the type of the power adapter when the power adapter does not receive the indication information and determines that within a preset time period the charging current provided to the mobile terminal by the power adapter is greater than or equals to a preset current threshold, activating, by the power adapter, the quick charging communication process, and transmitting, by the power adapter, the first instruction to the mobile terminal.

In combination with the second aspect or any of the above implementation manners, in another implementation manner of the second aspect, the reply instruction of the first instruction comprises multiple bits, and the multiple bits comprise a bit configured to indicate whether the mobile terminal agrees to activate the quick charging mode, and a bit configured to indicate a path impedance of the mobile terminal, and the path impedance of the mobile terminal is used for the power adapter to determine whether the USB interface is in good contact.

In combination with the second aspect or any of the above implementation manners, in another implementation manner of the second aspect, a format of the reply instruction of the first instruction is 101XYYYYYY, X indicates 1 bit, Y indicates 1 bit, X=1 indicates that the mobile terminal agrees to activate the quick charging mode, X=0 indicates that the mobile terminal disagrees to activate the quick charging mode, and the path impedance of the mobile terminal equals to YYYYYY*5mΩ.

In combination with the second aspect or any of the above implementation manners, in another implementation manner of the second aspect, the first instruction is 10101000 or 0xA8.

In combination with the second aspect or any of the above implementation manners, in another implementation manner of the second aspect, conducting, by the power adapter, the handshake communication with the mobile terminal via the second instruction to determine the charging voltage of the quick charging mode comprises: transmitting, by the power adapter, the second instruction to the mobile terminal, the second instruction being configured to query whether the current output voltage of the power adapter is proper to be the charging voltage of the quick charging mode; receiving, by the power adapter, a reply instruction of the second instruction from the mobile terminal, the reply instruction of the second instruction being configured to indicate that the current output voltage of the power adapter is proper, high, or low; determining, by the power adapter, the current output voltage of the power adapter to be the charging voltage of the quick charging mode when the reply instruction of the second instruction indicates that the current output voltage of the power adapter is proper; and adjusting, by the power adapter, the current output voltage of the power adapter according to the reply instruction of the second instruction when the reply instruction of the second instruction indicates that the current output voltage of the power adapter is high or low, repeating, by the power adapter, the handshake communication based on the second instruction to constantly adjust the current output voltage of the power adapter until the reply instruction of the second instruction indicates that the current output voltage of the power adapter is proper.

In combination with the second aspect or any of the above implementation manners, in another implementation manner of the second aspect, the reply instruction of the second instruction comprises multiple bits, the multiple bits of the reply instruction of the second instruction comprise a bit configured to indicate whether the current output voltage of the power adapter is proper, high, or low.

In combination with the second aspect or any of the above implementation manners, in another implementation manner of the second aspect, a format of the reply instruction of the second instruction is 1010XX0000, X indicates 1 bit, XX=11 indicates that the current output voltage of the power adapter is proper, XX=10 indicates that the current output voltage of the power adapter is high, XX=01 indicates that the current output voltage of the power adapter is low.

In combination with the second aspect or any of the above implementation manners, in another implementation manner of the second aspect, the second instruction is 10100100 or 0xA4.

In combination with the second aspect or any of the above implementation manners, in another implementation manner of the second aspect, conducting, by the power adapter, the handshake communication with the mobile terminal via the third instruction to determine the charging current of the quick charging mode comprises: transmitting, by the mobile terminal, the third instruction to the mobile terminal, the third instruction being configured to query a maximum charging current which is currently supported by the mobile terminal; receiving, by the power adapter, a reply instruction of the third instruction from the mobile terminal, the reply instruction of the third instruction being configured to indicate the maximum charging current which is currently supported by the mobile terminal; and determining, by the power adapter, the charging current of the quick charging mode according to the reply instruction of the third instruction.

In combination with the second aspect or any of the above implementation manners, in another implementation manner of the second aspect, the reply instruction of the third instruction comprises multiple bits, and the multiple bits of the reply instruction of the third instruction comprise a bit configured to indicate the maximum charging current which is currently supported by the mobile terminal.

In combination with the second aspect or any of the above implementation manners, in another implementation manner of the second aspect, a format of the reply instruction of the third instruction is 1010XXXXXX, X indicates 1 bit, the maximum charging current which is currently supported by the mobile terminal equals to 3000+(XXXXXX*250) mA.

In combination with the second aspect or any of the above implementation manners, in another implementation manner of the second aspect, the third instruction is 10100110 or 0xA6.

In combination with the second aspect or any of the above implementation manners, in another implementation manner of the second aspect, conducting, by the power adapter, the handshake communication with the mobile terminal via the fourth instruction during the constant current phase to adjust the current output current of the power adapter comprises: transmitting, by the power adapter, the fourth instruction to the mobile terminal during the constant current phase, the fourth instruction being configured to query a current voltage of the battery of the mobile terminal; and receiving, by the power adapter, a reply instruction of the fourth instruction from the mobile terminal, the reply instruction of the fourth instruction being configured to indicate the current voltage of the battery of the mobile terminal; and adjusting, by the power adapter, the current output current of the power adapter according to the current voltage of the battery.

In combination with the second aspect or any of the above implementation manners, in another implementation manner of the second aspect, the reply instruction of the fourth instruction comprises multiple bits, and the multiple bits of the reply instruction of the fourth instruction comprise a bit configured to indicate the current voltage of the battery, and a bit configured to indicate whether the battery is being charged.

In combination with the second aspect or any of the above implementation manners, in another implementation manner of the second aspect, a format of the reply instruction of the fourth instruction is 101XYYYYYY, X indicates 1 bit, Y indicates 1 bit, X=1 indicates that the battery is being charged, X=0 indicates that the battery is not charged, the current voltage of the battery equals to 3404+(YYYYYY*16) mV.

In combination with the second aspect or any of the above implementation manners, in another implementation manner of the second aspect, the fourth instruction is 10100010 or 0xA2.

In combination with the second aspect or any of the above implementation manners, in another implementation manner of the second aspect, the method further comprises: receiving, by the power adapter, information for indicating a path impedance of the mobile terminal from the mobile terminal; determining, by the power adapter, an impedance of a charging circuit from the power adapter to the battery according to the current output voltage of the power adapter and the current voltage of the battery during the constant current phase; determining, by the power adapter, whether the USB interface is in bad contact according to the impedance of the charging circuit, the path impedance of the mobile terminal, and a path impedance of a charging circuit between the power adapter and the mobile terminal; and when the USB interface being in bad contact, exiting, by the power adapter, the quick charging mode, or redetermining, by the power adapter, whether to activate the quick charging mode.

In combination with the second aspect or any of the above implementation manners, in another implementation manner of the second aspect, the method further comprises: transmitting, by the power adapter, a fifth instruction to the mobile terminal when the USB interface is in bad contact, the fifth instruction being configured to indicate that the USB interface is in bad contact and the power adapter is ready to exit the quick charging mode or redetermine whether to activate the quick charging mode.

In combination with the second aspect or any of the above implementation manners, in another implementation manner of the second aspect, the fifth instruction is 10110010 or 0xB2.

In combination with the second aspect or any of the above implementation manners, in another implementation manner of the second aspect, the method further comprises: executing, by the power adapter, at least one of following operations when the power adapter determines that a reply instruction received from the mobile terminal has an encoding error, and the following operations comprises: exiting the quick charging mode, stopping charging, or reactivating the quick charging communication process.

In combination with the second aspect or any of the above implementation manners, in another implementation manner of the second aspect, an instruction transmitted from the power adapter to the mobile terminal comprises multiple bits, when the power adapter transmits any instruction, the power adapter firstly transmits the most significant bit of multiple bits of the any instruction; or an instruction received from the mobile terminal by the power adapter comprises multiple bits, when the power adapter receives an instruction, the power adapter firstly receives the most significant bit of multiple bits of the instruction.

In combination with the second aspect or any of the above implementation manners, in another implementation manner of the second aspect, clock signals or clock interrupt signals used in the communication between the power adapter and the mobile terminal are provided by the power adapter.

In combination with the second aspect or any of the above implementation manners, in another implementation manner of the second aspect, an instruction transmitted from the power adapter to the mobile terminal comprises multiple bits, during a process of transmitting each of the multiple bits, the power adapter firstly transmits each bit, and then transmits the clock interrupt signal; or a reply instruction received from the mobile terminal by the power adapter comprises multiple bits, during a process of receiving each of the multiple bits, the power adapter firstly transmits the clock interrupt signal, and then receives each bit after a preset time interval.

In combination with the second aspect or any of the above implementation manners, in another implementation manner of the second aspect, each instruction transmitted from the power adapter to the mobile terminal comprises an 8-bit data, the power adapter transmits the 8-bit data to the mobile terminal via eight continuous clock periods of the clock signal, level of previous 10 μs of each of the eight continuous clock periods is low level, and level of latter 500 μs of each of the eight continuous clock periods is high level; or each reply instruction received from the mobile terminal by the power adapter comprises a 10-bit data, the power adapter receives the 10-bit data from the mobile terminal via ten continuous clock periods of the clock signal, level of previous 500 μs of each of the ten continuous clock periods is high level, and level of latter 10 μs of each of the ten continuous clock periods is low level.

In combination with the second aspect or any of the above implementation manners, in another implementation manner of the second aspect, during a process that the power adapter receives an instruction from the mobile terminal, a minimum value of high level of the clock signal equals to VDD of the power adapter minus 0.7V; or during the process that the power adapter receives an instruction from the mobile terminal, a maximum value of low level of the clock signal is 0.8V; or during a process that the power adapter transmits an instruction to the mobile terminal, the minimum value of the high level of the clock signal equals to 0.25VDD+0.8V; or during the process that the power adapter transmits an instruction to the mobile terminal, a maximum value of the high level of the clock signal is 4.5V; or during the process that the power adapter transmits an instruction to the mobile terminal, the maximum value of the low level of the clock signal is 0.15VDD; the VDD is a work voltage of the power adapter, and/or the VDD is greater than 3.2V and less than 4.5V.

In combination with the second aspect or any of the above implementation manners, in another implementation manner of the second aspect, after the mobile terminal receives the clock interrupt signal, holding time of a data of an instruction transmitted from the power adapter to the mobile terminal is 500±5 μs.

In combination with the third aspect, in an implementation manner of the third aspect, the reply instruction of the first instruction comprises multiple bits, and the multiple bits comprise a bit configured to indicate whether the mobile terminal agrees to activate the quick charging mode, and a bit configured to indicate a path impedance of the mobile terminal, and the path impedance of the mobile terminal is used for the power adapter to determine whether the USB interface is in good contact.

In combination with the third aspect or any of the above implementation manners, in another implementation manner of the third aspect, a format of the reply instruction of the first instruction is 101XYYYYYY, X indicates 1 bit, Y indicates 1 bit, X=1 indicates that the mobile terminal agrees to activate the quick charging mode, X=0 indicates that the mobile terminal disagrees to activate the quick charging mode, and the path impedance of the mobile terminal equals to YYYYYY*5mΩ.

In combination with the third aspect or any of the above implementation manners, in another implementation manner of the third aspect, the first instruction is 10101000 or 0xA8.

In combination with the third aspect or any of the above implementation manners, in another implementation manner of the third aspect, the communication control circuit is configured to receive the second instruction from the power adapter, and the second instruction is configured to query whether the current output voltage of the power adapter is proper to be the charging voltage of the quick charging mode. The communication control circuit is further configured to transmit a reply instruction of the second instruction to the power adapter, and the reply instruction of the second instruction is configured to indicate that the current output voltage of the power adapter is proper, high, or low, so as to cause the power adapter to determine the charging voltage of the quick charging mode according to the reply instruction of the second instruction.

In combination with the third aspect or any of the above implementation manners, in another implementation manner of the third aspect, a format of the reply instruction of the second instruction is 1010XX0000, X indicates 1 bit, XX=11 indicates that the current output voltage of the power adapter is proper, XX=10 indicates that the current output voltage of the power adapter is high, XX=01 indicates that the current output voltage of the power adapter is low.

In combination with the third aspect or any of the above implementation manners, in another implementation manner of the third aspect, the second instruction is 10100100 or 0xA4.

In combination with the third aspect or any of the above implementation manners, in another implementation manner of the third aspect, the communication control circuit is configured to receive the third instruction from the power adapter, the third instruction is configured to query a maximum charging current which is currently supported by the mobile terminal; the communication control circuit is further configured to transmit a reply instruction of the third instruction for indicating the maximum charging current which is currently supported by the mobile terminal to the power adapter, so as to cause the power adapter to determine the charging current of the quick charging mode according to the reply instruction of the third instruction.

In combination with the third aspect or any of the above implementation manners, in another implementation manner of the third aspect, the reply instruction of the third instruction comprises multiple bits, and the multiple bits of the reply instruction of the third instruction comprise a bit configured to indicate the maximum charging current which is currently supported by the mobile terminal.

In combination with the third aspect or any of the above implementation manners, in another implementation manner of the third aspect, a format of the reply instruction of the third instruction is 1010XXXXXX, X indicates 1 bit, the maximum charging current which is currently supported by the mobile terminal equals to 3000+(XXXXXX*250)mA.

In combination with the third aspect or any of the above implementation manners, in another implementation manner of the third aspect, the third instruction is 10100110 or 0xA6.

In combination with the third aspect or any of the above implementation manners, in another implementation manner of the third aspect, the communication control circuit is configured to receive the fourth instruction from the power adapter during the constant current phase, and the fourth instruction is configured to query a current voltage of the battery of the mobile terminal. The communication control circuit is further configured to transmit a reply instruction of the fourth instruction for indicating the current voltage of the battery of the mobile terminal to the power adapter, so as to cause the power adapter to adjust the current output current of the power adapter according to the current voltage of the battery.

In combination with the third aspect or any of the above implementation manners, in another implementation manner of the third aspect, the reply instruction of the fourth instruction comprises multiple bits, and the multiple bits of the reply instruction of the fourth instruction comprise a bit configured to indicate the current voltage of the battery, and a bit configured to indicate whether the battery is being charged.

In combination with the third aspect or any of the above implementation manners, in another implementation manner of the third aspect, a format of the reply instruction of the fourth instruction is 101XYYYYYY, X indicates 1 bit, Y indicates 1 bit, X=1 indicates that the battery is being charged, X=0 indicates that the battery is not charged, the current voltage of the battery equals to 3404+(YYYYYY*16) mV.

In combination with the third aspect or any of the above implementation manners, in another implementation manner of the third aspect, the fourth instruction is 10100010 or 0xA2.

In combination with the third aspect or any of the above implementation manners, in another implementation manner of the third aspect, the communication control circuit is further configured to transmit information for indicating a path impedance of the mobile terminal to the power adapter, so as to cause the power adapter to determine whether the USB interface is in bad contact according to the path impedance during the constant current phase. The communication control circuit is further configured to receive a fifth instruction from power adapter when the power adapter determines that the USB interface is in bad contact, and the fifth instruction is configured to indicate that the USB interface is in bad contact and the power adapter is ready to exit the quick charging mode or reactivate the quick charging communication process.

In combination with the third aspect or any of the above implementation manners, in another implementation manner of the third aspect, the fifth instruction is 10110010 or 0xB2.

In combination with the third aspect or any of the above implementation manners, in another implementation manner of the third aspect, the communication control circuit is further configured to execute at least one of following operations when the power adapter determines that a reply instruction received from the mobile terminal has an encoding error, and the following operations comprise: exiting the quick charging mode, stopping charging, or reactivating the quick charging communication process.

In combination with the third aspect or any of the above implementation manners, in another implementation manner of the third aspect, an instruction transmitted from the mobile terminal to the power adapter comprises multiple bits, before the mobile terminal transmits any instruction, the mobile terminal firstly transmits the most significant bit of multiple bits of the any instruction; or an instruction received from the power adapter by the mobile terminal comprises multiple bits, when the mobile terminal receives an instruction, the mobile terminal firstly receives the most significant bit of multiple bits of the instruction.

In combination with the third aspect or any of the above implementation manners, in another implementation manner of the third aspect, clock signals used in the communication between the power adapter and the mobile terminal are provided by the power adapter.

In combination with the third aspect or any of the above implementation manners, in another implementation manner of the third aspect, an instruction transmitted from the power adapter to the mobile terminal comprises multiple bits, during a process of transmitting each of the multiple bits, the power adapter firstly transmits each bit, and then transmits a clock interrupt signal; or a reply instruction received from the mobile terminal by the power adapter comprises multiple bits, during a process of receiving each of the multiple bits, the power adapter firstly transmits the clock interrupt signal, and receives each bit after a preset time interval.

In combination with the third aspect or any of the above implementation manners, in another implementation manner of the third aspect, each instruction transmitted from the power adapter to the mobile terminal comprises an 8-bit data, the power adapter transmits the 8-bit data to the mobile terminal via eight continuous clock periods of the clock signal, level of previous 10 μs of each of the eight continuous clock periods is low level, and level of latter 500 μs of each of the eight continuous clock periods is high level; or each reply instruction received from the mobile terminal by the power adapter comprises a 10-bit data, the power adapter receives the 10-bit data from the mobile terminal via ten continuous clock periods of the clock signal, level of previous 500 μs of each of the ten continuous clock periods is high level, and level of latter 10 μs of each of the ten continuous clock periods is low level.

In combination with the third aspect or any of the above implementation manners, in another implementation manner of the third aspect, during a process that the power adapter receives an instruction from the mobile terminal, a minimum value of high level of the clock signal equals to VDD of the power adapter minus 0.7V; or during the process that the power adapter receives an instruction from the mobile terminal, a maximum value of low level of the clock signal is 0.8V; or during a process that the power adapter transmits an instruction to the mobile terminal, the minimum value of the high level of the clock signal equals to 0.25VDD+0.8V; or during the process that the power adapter transmits an instruction to the mobile terminal, a maximum value of the high level of the clock signal is 4.5V; or during the process that the power adapter transmits an instruction to the mobile terminal, the maximum value of the low level of the clock signal is 0.15VDD; the VDD is a work voltage of the power adapter, and/or the VDD is greater than 3.2V and less than 4.5V.

In combination with the third aspect or any of the above implementation manners, in another implementation manner of the third aspect, after the mobile terminal receives the clock interrupt signal, holding time of a data of an instruction transmitted from the power adapter to the mobile terminal is 500±5 μs.

In combination with the fourth aspect, in an implementation manner of the fourth aspect, the communication control circuit is further configured to detect a charging current provided to the mobile terminal by the power adapter, determine that the mobile terminal has recognized the type of the power adapter when the power adapter does not receive the indication information and determines that within a preset time period the charging current provided to the mobile terminal by the power adapter is greater than or equals to a preset current threshold, activate the quick charging communication process, and transmit the first instruction to the mobile terminal.

In combination with the fourth aspect or any of the above implementation manners, in another implementation manner of the fourth aspect, the reply instruction of the first instruction comprises multiple bits, and the multiple bits comprise a bit configured to indicate whether the mobile terminal agrees to activate the quick charging mode, and a bit configured to indicate a path impedance of the mobile terminal, the path impedance of the mobile terminal is used for the power adapter to determine whether the USB interface is in good contact.

In combination with the fourth aspect or any of the above implementation manners, in another implementation manner of the fourth aspect, a format of the reply instruction of the first instruction is 101XYYYYYY, X indicates 1 bit, Y indicates 1 bit, X=1 indicates that the mobile terminal agrees to activate the quick charging mode, X=0 indicates that the mobile terminal disagrees to activate the quick charging mode, and the path impedance of the mobile terminal equals to YYYYYY*5m.

In combination with the fourth aspect or any of the above implementation manners, in another implementation manner of the fourth aspect, the first instruction is 10101000 or 0xA8.

In combination with the fourth aspect or any of the above implementation manners, in another implementation manner of the fourth aspect, the communication control circuit is configured to transmit the second instruction to the mobile terminal, and the second instruction is configured to query whether the current output voltage of the power adapter is proper to be the charging voltage of the quick charging mode. The communication control circuit is further configured to receive a reply instruction of the second instruction from the mobile terminal, and the reply instruction of the second instruction is configured to indicate that the current output voltage of the power adapter is proper, high, or low. The communication control circuit is further configured to determine the current output voltage of the power adapter to be the charging voltage of the quick charging mode when the reply instruction of the second instruction indicates that the current output voltage of the power adapter is proper, adjust the current output voltage of the power adapter according to the reply instruction of the second instruction when the reply instruction of the second instruction indicates that the current output voltage of the power adapter is high or low, and repeat the handshake communication based on the second instruction to constantly adjust the current output voltage of the power adapter until the reply instruction of the second instruction indicates that the current output voltage of the power adapter is proper.

In combination with the fourth aspect or any of the above implementation manners, in another implementation manner of the fourth aspect, the reply instruction of the second instruction comprises multiple bits, the multiple bits of the reply instruction of the second instruction comprise a bit configured to indicate that the current output voltage of the power adapter is proper, high, or low.

In combination with the fourth aspect or any of the above implementation manners, in another implementation manner of the fourth aspect, a format of the reply instruction of the second instruction is 1010XX0000, X indicates 1 bit, XX=11 indicates that the current output voltage of the power adapter is proper, XX=10 indicates that the current output voltage of the power adapter is high, XX=01 indicates that the current output voltage of the power adapter is low.

In combination with the fourth aspect or any of the above implementation manners, in another implementation manner of the fourth aspect, the second instruction is 10100100 or 0xA4.

In combination with the fourth aspect or any of the above implementation manners, in another implementation manner of the fourth aspect, the communication control circuit is configured to transmit the third instruction to the mobile terminal, and the third instruction is configured to query a maximum charging current which is currently supported by the mobile terminal. The communication control circuit is further configured to receive a reply instruction of the third instruction from the mobile terminal, and the reply instruction of the third instruction is configured to indicate the maximum charging current which is currently supported by the mobile terminal. The communication control circuit is further configured to determine the charging current of the quick charging mode according to the reply instruction of the third instruction.

In combination with the fourth aspect or any of the above implementation manners, in another implementation manner of the fourth aspect, the reply instruction of the third instruction comprises multiple bits, and the multiple bits of the reply instruction of the third instruction comprise a bit configured to indicate the maximum charging current which is currently supported by the mobile terminal.

In combination with the fourth aspect or any of the above implementation manners, in another implementation manner of the fourth aspect, a format of the reply instruction of the third instruction is 1010XXXXXX, X indicates 1 bit, the maximum charging current which is currently supported by the mobile terminal equals to 3000+(XXXXXX*250)mA.

In combination with the fourth aspect or any of the above implementation manners, in another implementation manner of the fourth aspect, the third instruction is 10100110 or 0xA6.

In combination with the fourth aspect or any of the above implementation manners, in another implementation manner of the fourth aspect, the communication control circuit is configured to transmit the fourth instruction to the mobile terminal during the constant current phase, and the fourth instruction is configured to query a current voltage of the battery of the mobile terminal. The communication control circuit is further configured to receive a reply instruction of the fourth instruction from the mobile terminal, and the reply instruction of the fourth instruction is configured to indicate the current voltage of the battery of the mobile terminal. The communication control circuit is further configured to adjust the output current of the power adapter according to the current voltage of the battery.

In combination with the fourth aspect or any of the above implementation manners, in another implementation manner of the fourth aspect, the reply instruction of the fourth instruction comprises multiple bits, and the multiple bits of the reply instruction of the fourth instruction comprise a bit configured to indicate the current voltage of the battery, and a bit configured to indicate whether the battery is being charged.

In combination with the fourth aspect or any of the above implementation manners, in another implementation manner of the fourth aspect, a format of the reply instruction of the fourth instruction is 101XYYYYYY, X indicates 1 bit, Y indicates 1 bit, X=1 indicates that the battery is being charged, X=0 indicates that the battery is not charged, the current voltage of the battery equals to 3404+(YYYYYY*16)mV.

In combination with the fourth aspect or any of the above implementation manners, in another implementation manner of the fourth aspect, the fourth instruction is 10100010 or 0xA2.

In combination with the fourth aspect or any of the above implementation manners, in another implementation manner of the fourth aspect, the communication control circuit is further configured to receive information for indicating a path impedance of the mobile terminal from the mobile terminal, determine an impedance of a charging circuit from the power adapter to the battery according to the current output voltage of the power adapter and the current voltage of the battery during the constant current phase, determine whether the USB interface is in bad contact according to the impedance of the charging circuit, the path impedance of the mobile terminal, and a path impedance of a charging circuit between the power adapter and the mobile terminal, and exit the quick charging mode or redetermine whether to activate the quick charging mode when the USB interface is in bad contact.

In combination with the fourth aspect or any of the above implementation manners, in another implementation manner of the fourth aspect, the communication control circuit is further configured to transmit a fifth instruction to the mobile terminal when the USB interface is in bad contact, and the fifth instruction is configured to indicate that the USB interface is in bad contact and the power adapter is ready to exit the quick charging mode or redetermine whether to activate the quick charging mode.

In combination with the fourth aspect or any of the above implementation manners, in another implementation manner of the fourth aspect, the fifth instruction is 10110010 or 0xB2.

In combination with the fourth aspect or any of the above implementation manners, in another implementation manner of the fourth aspect, the communication control circuit is further configured to execute at least one of following operations when the power adapter determines that a reply instruction received from the mobile terminal has an encoding error, and the following operations comprise: exiting the quick charging mode, stopping charging, or reactivating the quick charging communication process.

In combination with the fourth aspect or any of the above implementation manners, in another implementation manner of the fourth aspect, an instruction transmitted from the power adapter to the mobile terminal comprises multiple bits, when the power adapter transmits any instruction, the power adapter firstly transmits the most significant bit of multiple bits of the any instruction; or an instruction received from the mobile terminal by the power adapter comprises multiple bits, when the power adapter receives an instruction, the power adapter firstly receives the most significant bit of multiple bits of the instruction.

In combination with the fourth aspect or any of the above implementation manners, in another implementation manner of the fourth aspect, clock signals or clock interrupt signals used in the communication between the power adapter and the mobile terminal are provided by the power adapter.

In combination with the fourth aspect or any of the above implementation manners, in another implementation manner of the fourth aspect, an instruction transmitted from the power adapter to the mobile terminal comprises multiple bits, during a process of transmitting each of the multiple bits, the power adapter firstly transmits each bit, and then transmits the clock interrupt signal; or a reply instruction received from the mobile terminal by the power adapter comprises multiple bits, during a process of receiving each of the multiple bits, the power adapter firstly transmits the clock interrupt signal, and then receives each bit after a preset time interval.

In combination with the fourth aspect or any of the above implementation manners, in another implementation manner of the fourth aspect, each instruction transmitted from the power adapter to the mobile terminal comprises an 8-bit data, the power adapter transmits the 8-bit data to the mobile terminal via eight continuous clock periods of the clock signal, level of previous 10 μs of each of the eight continuous clock periods is low level, and level of latter 500 μs of each of the eight continuous clock periods is high level; or each reply instruction received from the mobile terminal by the power adapter comprises a 10-bit data, the power adapter receives the 10-bit data from the mobile terminal via ten continuous clock periods of the clock signal, level of previous 500 μs of each of the ten continuous clock periods is high level, and level of latter 10 μs of each of the ten continuous clock periods is low level.

In combination with the fourth aspect or any of the above implementation manners, in another implementation manner of the fourth aspect, during a process that the power adapter receives an instruction from the mobile terminal, a minimum value of high level of the clock signal equals to VDD of the power adapter minus 0.7V; or during the process that the power adapter receives an instruction from the mobile terminal, a maximum value of low level of the clock signal is 0.8V; or during a process that the power adapter transmits an instruction to the mobile terminal, the minimum value of the high level of the clock signal equals to 0.25VDD+0.8V; or during the process that the power adapter transmits an instruction to the mobile terminal, a maximum value of the high level of the clock signal is 4.5V; or during the process that the power adapter transmits an instruction to the mobile terminal, the maximum value of the low level of the clock signal is 0.15VDD; the VDD is a work voltage of the power adapter, and/or the VDD is greater than 3.2V and less than 4.5V.

In combination with the fourth aspect or any of the above implementation manners, in another implementation manner of the fourth aspect, after the mobile terminal receives the clock interrupt signal, holding time of a data of an instruction transmitted from the power adapter to the mobile terminal is 500±5 μs.

The technical solution of embodiments of the present disclosure will be described clearly and completely in combination with the accompanying drawings of the embodiments of the present disclosure. Obviously, the described embodiments are a part of embodiments of the present disclosure, and not all of the embodiments. According to the embodiments of the present disclosure, other embodiments obtained by those skilled in the art without creative work all fall within the protection scope of the present disclosure.

FIG. 1 is a schematic diagram of a quick charging process in accordance with an embodiment of the present disclosure.

As illustrated by FIG. 1, a quick charging communication process may include five phases.

Phase 1:

The mobile terminal can detect a type of the power adapter via a positive data (D+) line and a negative data (D−) line. When it is determined that the power adapter is a non-USB charging device, a current absorbed by the mobile terminal can be greater than a preset current threshold I2. When the power adapter determines that within a preset time length (for example, continuous T1 time length) an output current of the power adapter is greater than or equal to I2, the power adapter determines that the mobile terminal has recognized the type of the power adapter, and the power adapter activates a handshake communication between the power adapter and the mobile terminal. The power adapter transmits a first instruction to query whether the mobile terminal is to activate a quick charging mode.

When a reply instruction received from the mobile terminal by the power adapter indicates that the mobile terminal disagrees to activate the quick charging mode, the power adapter redetects the output current of the power adapter. When the output current of the power adapter is still greater than or equal to I2, the power adapter retransmits the request to query whether the mobile terminal is to activate the quick charging mode, and the above steps of the phase 1 are repeated until the mobile terminal agrees to activate the quick charging mode or the output current of the power adapter is no longer greater than or equal to I2.

When the mobile terminal agrees to activate quick charging, the quick charging communication process enters a phase 2.

Phase 2:

The power adapter can output different voltage level. The power adapter transmits a second instruction to query the mobile terminal for whether an output voltage of the power adapter is proper (that is, whether the output voltage is proper to be a charging voltage of the quick charging mode).

The mobile terminal transmits a reply to the power adapter to inform the power adapter that the output voltage of the power adapter is high, low, or proper. If the reply the power adapter received from the mobile terminal indicates that the output voltage of the power adapter is high or low, the power adapter selects another output voltage level, and retransmits the second instruction to the mobile terminal to requery the mobile terminal for whether the output voltage of the power adapter is proper.

The above steps of the phase 2 are repeated until the mobile terminal returns a reply to the power adapter to inform the power adapter that the output voltage of the power adapter is proper, and the quick charging communication process enters a phase 3.

Phase 3:

The power adapter transmits a third instruction to the mobile terminal to query a maximum charging current which is currently supported by the mobile terminal. The mobile terminal transmits a reply to the power adapter to inform the power adapter of the maximum charging current which is currently supported by the mobile terminal, and the quick charging communication process enters a phase 4.

Phase 4:

The power adapter sets the output current of the power adapter to be the maximum charging current which is currently supported by the mobile terminal, and the quick charging communication process enters a constant current phase, that is, a phase 5.

Phase 5:

After entering the constant current phase, the power adapter transmits a fourth instruction every time interval to query a current voltage of a battery of the mobile terminal. The mobile terminal can transmit a reply to the power adapter to inform the power adapter of the current voltage of the battery of the mobile terminal. The power adapter can determine whether a USB interface is in good contact and whether it is needed to decrease the current charging current value of the mobile terminal according to the reply for indicating the current voltage of the battery of the mobile terminal. When the power adapter determines that the USB interface is in bad contact, the power adapter transmits a fifth instruction to the mobile terminal, and then resets to reenter the phase 1.

It can be understood that in the constant current phase the output current of the power adapter does not keep unchanged all the time. The constant current phase is a multi-stage constant current phase, that is, the output current of the power adapter keeps unchanged within a period.

Figure 11:
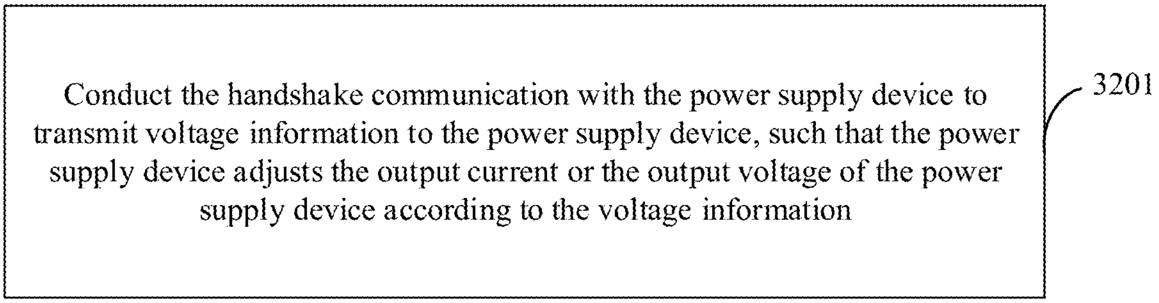
FIG. 11 is a schematic flow chart illustrating a detailed operation of block 320 of FIG. 8 and FIG. 9.

FIGS. 2-11 are schematic flow charts illustrating quick charging methods in accordance with an embodiment of the present disclosure. Operations at blocks 110-160 in FIG. 2, operations at blocks 110-130 and 210 in FIG. 3, operations at blocks 1101-1103 in FIG. 4, operations at blocks 1301-1302 in FIG. 5, operations at blocks 1104-1105 in FIG. 6, operations at blocks 1106-1108 in FIG. 7, operations at blocks 310-330 in FIG. 8, operations at blocks 310-320 and 410 in FIG. 9, an operation at block 3101 in FIG. 10, and an operation at block 3201 in FIG. 11 are illustrated in the following and will not be repeated herein.

The above quick charging communication process is finished based on negotiation between the power adapter and the mobile terminal, and safety of quick charging can be ensured.

Specifically, during the whole process, the power adapter acts as a host, and conducts a handshake communication with the mobile terminal actively. The power adapter firstly determines whether to activate the quick charging communication process. After activating the quick charging communication process, the host transmits an instruction to the mobile terminal. A condition that causes the power adapter to determine to activate the quick charging process is that the power adapter determines that within the preset time period the output current of the power adapter is greater than or equals to 12. When the power adapter determines that the condition is satisfied, the power adapter determines that the mobile terminal has recognized the type of the power adapter, that is, determines that the mobile terminal has recognized that the power adapter is a non-USB charging device (or has recognized that the power adapter is a standard charging device, and is not a non-standard charging device, such as a computer, or has recognized that the power adapter is not a computer, that is, the non-USB charging device can refer to any other type charging device except a computer). By means of such a detection manner, the power adapter can be acted as a host, and the quick charging communication process is simplified. However, this manner is similar to a blind detection manner, that is, the power adapter guesses that the mobile terminal has recognized the type of the power adapter. Adopting the blind detection manner, certain errors may occur. For example, if a standard charging current of some mobile terminals is I2 (or about I2), the current detected by the power adapter may not be exactly right, and the power adapter determines that the charging current of such mobile terminals is less than 12, which may result in that such mobile terminals cannot activate quick charging communication all the time and have to adopt a standard charging method for charging.

Figure 12:
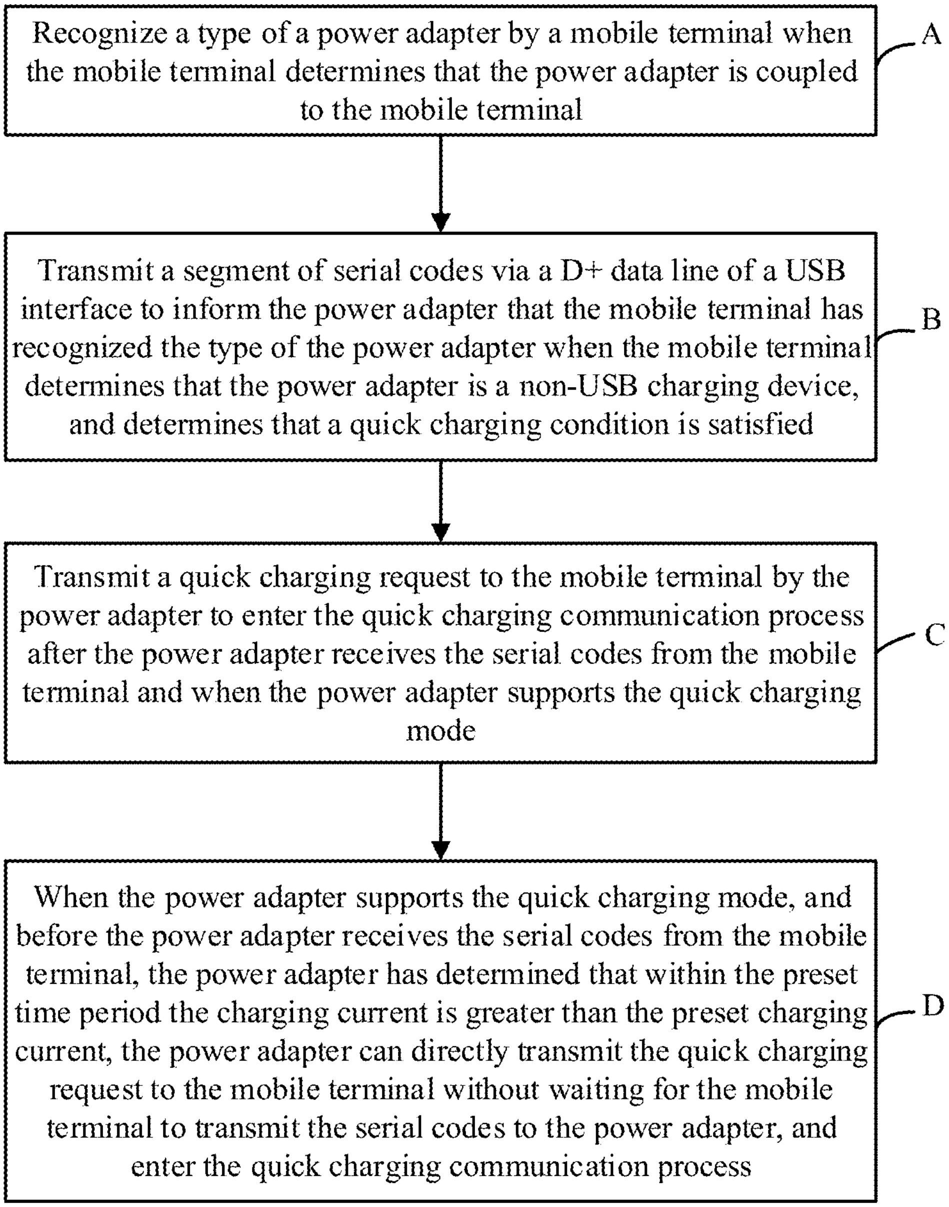
FIG. 12 is a schematic flow chart of a quick charging method in accordance with an embodiment of the present disclosure.

To avoid the above problems, the following will describe a quick charging method in accordance with another embodiment of the present disclosure in combination with FIG. 12. In the embodiment illustrated by FIG. 12, after the mobile terminal has recognized that the power adapter is a non-USB charging device, the mobile terminal transmits an indication message, for example, a segment of serial codes, to inform the power adapter that type recognition has finished, and inform the power adapter to activate the quick charging communication process. FIG. 12 includes following steps.

Step A: the mobile terminal recognizes the type of the power adapter when the mobile terminal determines that the power adapter is coupled to the mobile terminal.

Step B: when the mobile terminal determines that the power adapter is a non-USB charging device, and determines that a quick charging condition is satisfied, the mobile terminal transmits a segment of serial codes via the D+ data line of a USB interface to inform the power adapter that the mobile terminal has recognized the type of the power adapter.

According to a BC1.2 protocol, a main process of recognizing the type of the power adapter is that: when a high level signal is transmitted via the D+ and the high level signal can be received via the D−, it is determined that the power adapter is a standard charging device (non-USB charging device). In the embodiment of the present disclosure, the power adapter which can support the quick charging mode includes a micro controller unit (MCU), and during the charging process, the MCU communicates with the mobile terminal via the data lines of the USB interface. Thus, different from the BC1.2 protocol, the D+ and D− are not shorted. At this point, to cause the mobile terminal to correctly recognize the type of the power adapter, the voltage level of the D+ is set to be high. In the embodiment of the present disclosure, the serial codes can be transmitted via the D+.

Step C: when the power adapter supports the quick charging mode, after the power adapter receives the serial codes from the mobile terminal, the power adapter transmits a quick charging request to the mobile terminal to enter the quick charging communication process.

Step D: when the power adapter supports the quick charging mode, and before the power adapter receives the serial codes from the mobile terminal, the power adapter has determined that within the preset time period the charging current is greater than the preset charging current, the power adapter can directly transmit the quick charging request to the mobile terminal without waiting for the mobile terminal to transmit the serial codes to the power adapter, and enter the quick charging communication process.

Figure 13:
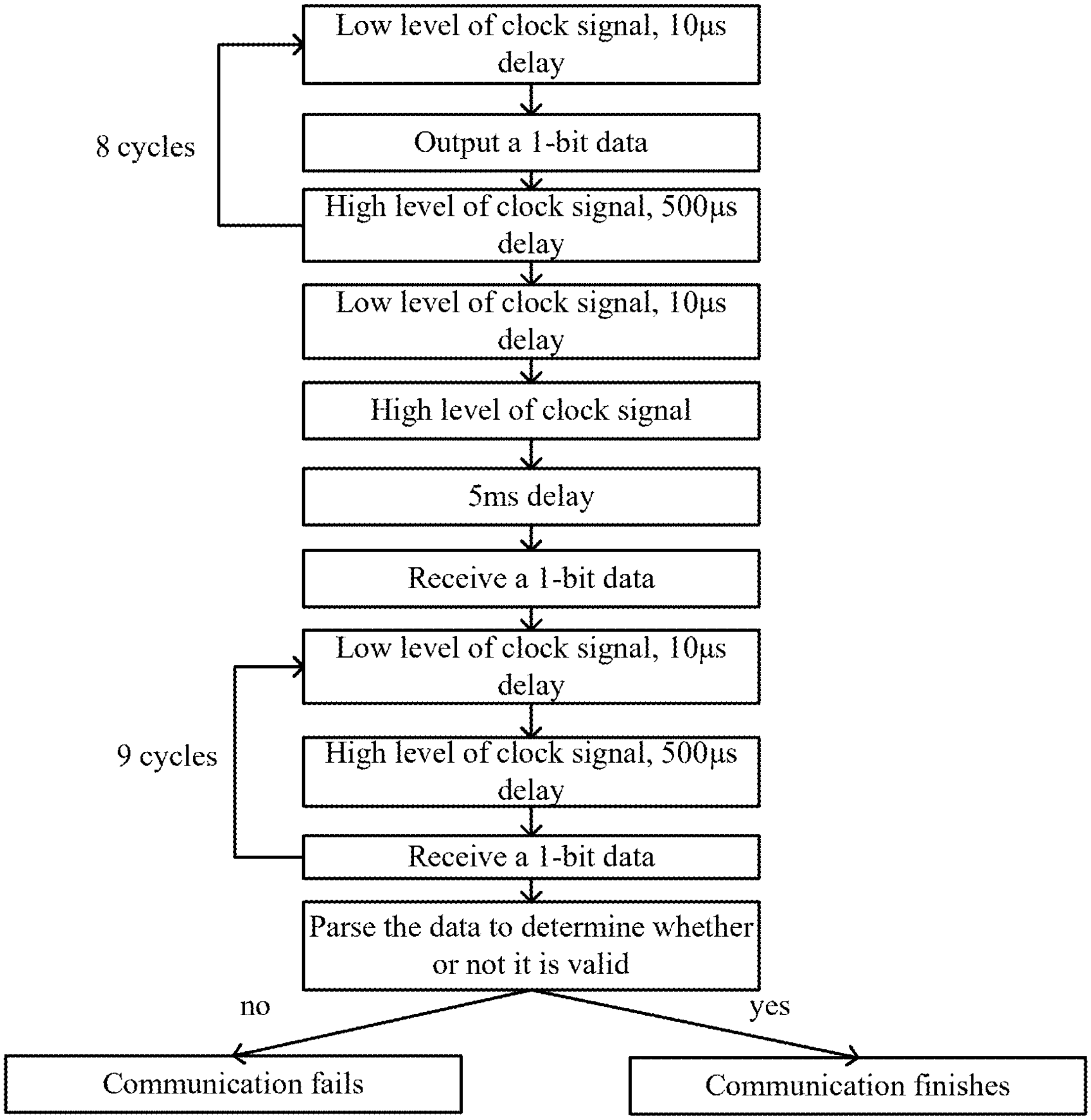
FIG. 13 is a schematic view showing that a power adapter implements a data reception and transmission in accordance with an embodiment of the present disclosure.
Figure 14:
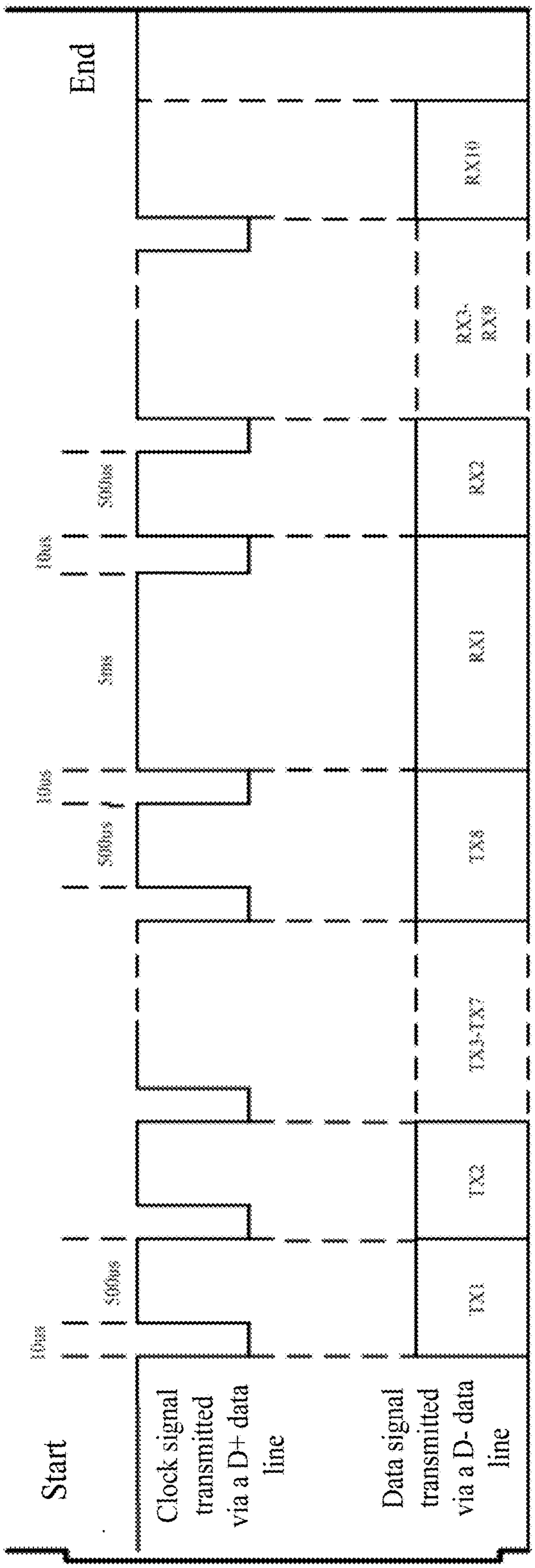
FIG. 14 is a schematic view of a communication sequence of a power adapter in accordance with an embodiment of the present disclosure.
Figure 15:
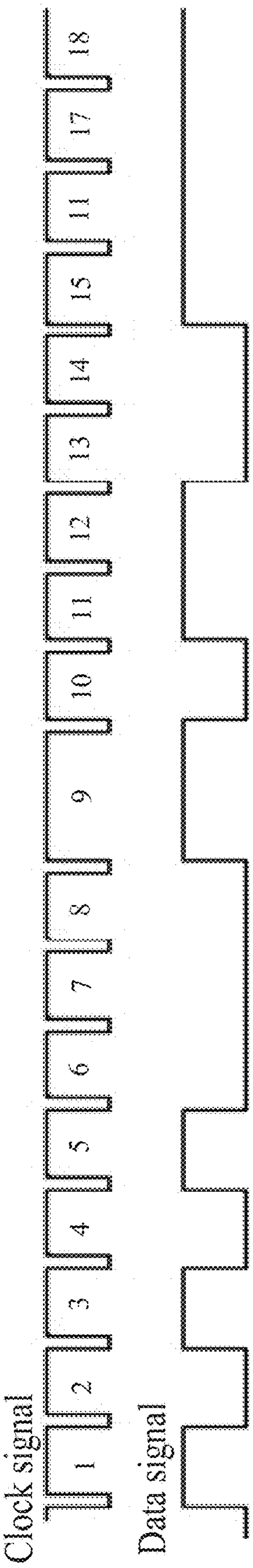
FIG. 15 is a schematic view of a communication sequence of a power adapter in accordance with an embodiment of the present disclosure.

The following will describe embodiments of the present disclosure more specifically in combination with detailed examples. It should be noted that examples of FIGS. 13-15 are just used to help those skilled in the art to understand the embodiments of the present disclosure, and not used to limit the embodiments of the present disclosure to detailed values or detailed scenarios which are illustrated in the examples. Apparently, those skilled in the art can make various equivalent modification or change according to the examples illustrated by FIGS. 13-15, and such modification or change shall fall within the scope of the embodiments of the present disclosure.

Firstly, a quick charging communication instruction set of the power adapter and the mobile terminal can be defined. For example, the quick charging communication instruction set is illustrated by the table 1.

TABLE 1

| Quick charging communication instruction set | | |
|---|---|---|
| Instruction 1: requesting for quick charging | | |
| Power adapter -> Mobile terminal | 10101000 | 0xA8 |
| Mobile terminal -> Power adapter | 101XYYYYYY | X: 1 -> Agree 0 -> Disagree, Path impedance = YYYYYY*5(mΩ) |
| Instruction 2: querying whether a voltage of the power adapter is proper | | |
| Power adapter -> Mobile terminal | 10100100 | 0xA4 |
| Mobile terminal -> Power adapter | 1010XX0000 | XX: 11 -> Proper 10 -> High 01 -> Low 00 -> Error |
| Instruction 3: querying for a maximum charging current which is currently supported by the mobile terminal | | |
| Power adapter -> Mobile terminal | 10100110 | 0xA6 |
| Mobile terminal -> Power adapter | 1010XXXXXX | Maximum charging current currently supported by the mobile terminal = 3000 + (XXXXXX*250)(mA) |
| Instruction 4: querying for a current voltage of a battery of the mobile terminal | | |
| Power adapter -> Mobile terminal | 10100010 | 0xA2 |
| Mobile terminal -> Power adapter | 101XYYYYYY | X: 1 -> Being charged 0 -> Uncharged, Battery voltage = 3404 + (YYYYYY*16)(mV) |
| Instruction 5: informing the mobile terminal that USB connection is poor and quick charging should be stopped | | |

TABLE 1-continued

| Quick charging communication instruction set | | |
| --- | --- | --- |
| Power adapter -> Mobile terminal | 10110010 | 0xB2 |
| Mobile terminal -> Power adapter | NONE | |

From table 1, it can be seen that for each communication the power adapter firstly transmits an 8-bit data, and then the mobile terminal returns a 10-bit data. When the power adapter transmits a data, the power adapter can firstly transmit the most significant bit (MSB). Similarly, when the power adapter receives a data, the power adapter firstly receives the MSB. Clock signals for data transmission and data reception of the power adapter can be provided by the power adapter.

When the power adapter transmits a data, the power adapter transmits each bit of the data before transmitting a clock interrupt signal, which can guarantee the accuracy of the data received by the mobile terminal. When the power adapter receives a data, the power adapter can firstly transmit the clock interrupt signal, and then receive each bit of the data after a certain time, which can guarantee the accuracy and reliability of the data received by the power adapter.

FIG. 13 is a schematic view showing that the power adapter implements a data reception and data transmission in accordance with an embodiment of the present disclosure. For FIG. 13, there are a number of methods for parsing a data to determine whether the data is valid. For example, previous n bits of a data can be defined as 101 in advance. When previous 3 bits of a data received by the power adapter is not 101, the data is determined as an invalid data, and communication fails. Or, a received data is defined to include 10 bits in advance. If a received data does not include 10 bits, the received data is determined as an invalid data, and communication fails.

FIG. 14 is a schematic view of a communication sequence of the power adapter in accordance with an embodiment of the present disclosure. From FIG. 14, a relationship between a communication sequence indicated by the clock signals which are transmitted by the D+ data line and data signals transmitted by the D-data line. FIG. 15 shows a detailed example. In FIG. 15, after the power adapter transmits the instruction 10101000 to the mobile terminal, the power adapter receives the reply instruction 1011001111 from the mobile terminal.

Figure 16:
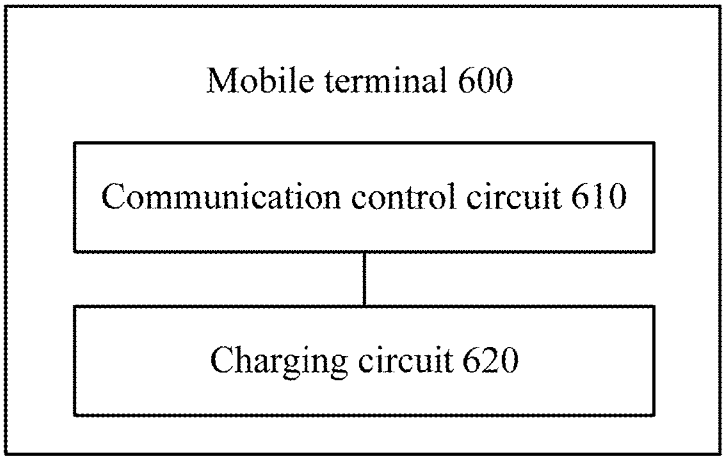
FIG. 16 is a diagrammatic view of a mobile terminal in accordance with an embodiment of the present disclosure.
Figure 17:
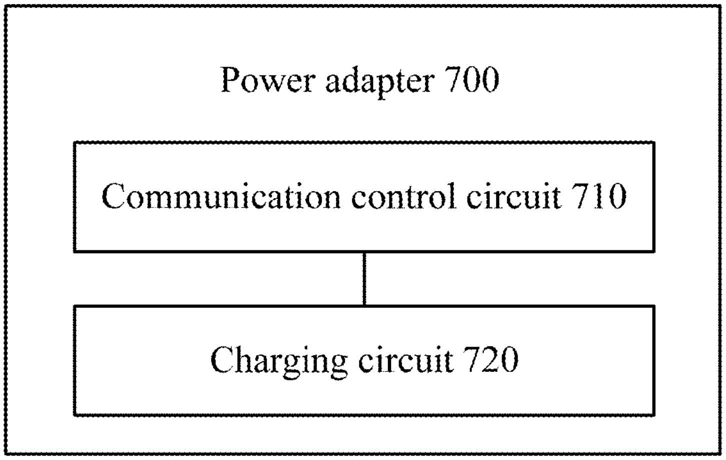
FIG. 17 is a diagrammatic view of a power adapter in accordance with an embodiment of the present disclosure.

In combination with FIGS. 16-17, the following will specifically describe the mobile terminal and the power adapter of the embodiments of the present disclosure. It can be understood that the mobile terminal of FIG. 16 can implement various functions described in the quick charging method, and the power adapter of FIG. 17 can implement various functions described in the quick charging method. To avoid repetition, detailed description will be omitted.

FIG. 16 is a diagrammatic view of a mobile terminal in accordance with an embodiment of the present disclosure. A mobile terminal 600 of FIG. 16 is coupled to a power adapter via a USB interface. A power line of the USB interface is used for charging a battery of the mobile terminal 600. Data lines of the USB interface are used for communication between the mobile terminal 600 and the power adapter. The mobile terminal 600 supports a normal charging mode and a quick charging mode, and a charging speed of the quick charging mode is greater than that of the normal charging mode. The mobile terminal 600 includes a communication control circuit 610 and a charging circuit 620.

The communication control circuit 610 is configured to determine a type of the power adapter when it is determined that the power adapter is coupled to the mobile terminal 600. When it is determined that the power adapter is a non-USB power adapter, the communication control circuit 610 transmits indication information, and the indication information is configured to indicate that the mobile terminal 600 has recognized the type of the power adapter and inform the power adapter to activate a quick charging communication process. After the power adapter activates the quick charging communication process, the communication control circuit 610 receives a first instruction from the power adapter, and the first instruction is configured to query the mobile terminal 600 whether the mobile terminal 600 agrees to charge the battery in the quick charging mode. The communication control circuit 610 transmits a reply instruction of the first instruction to the power adapter, and the reply instruction of the first instruction is configured to indicate that the mobile terminal 600 agrees to charge the battery in the quick charging mode. The communication control circuit 610 conducts a handshake communication with the power adapter via a second instruction transmitted by the power adapter to determine a charging voltage of the quick charging mode, and conducts a handshake communication with the power adapter via a third instruction transmitted by the power adapter to determine a charging current of the quick charging mode. After the power adapter adjusts an output voltage and output current of the power adapter to be the charging voltage and charging current of the quick charging mode and enters the constant current phase, the communication control circuit 610 conducts a handshake communication with the power adapter via a fourth instruction transmitted by the power adapter to cause the power adapter to adjust the output current and charge the battery in a multi-stage constant current mode via the charging circuit 620.

In embodiments of the present disclosure, the power adapter does not increase the charging current blindly for quick charging, but negotiates with the mobile terminal via communication with the mobile terminal to determine whether the quick charging mode can be adopted. Comparing with the present technology, the security of the quick charging process is improved.

Optionally, in an embodiment, the reply instruction of the first instruction includes multiple bits, and the multiple bits include a bit configured to indicate whether the mobile terminal 600 agrees to activate the quick charging mode, and a bit configured to indicate a path impedance of the mobile terminal 600. The path impedance of the mobile terminal 600 is used for the power adapter to determine whether the USB interface is in good contact.

Optionally, in an embodiment, a format of the reply instruction of the first instruction is 101XYYYYYY, X indicates 1 bit, and Y indicates 1 bit. X=1 indicates that the mobile terminal 600 agrees to activate the quick charging mode, X=0 indicates that the mobile terminal 600 does not agree to activate the quick charging mode, and the path impedance of the mobile terminal 600 equals to YYYYYY*5mΩ.

Optionally, in an embodiment, the first instruction is 10101000 or 0xA8.

Optionally, in an embodiment, the communication control circuit 610 is configured to receive a second instruction from the power adapter, and the second instruction is configured to query whether the current output voltage of the power adapter is proper to be set to be the charging voltage of the quick charging mode. The communication control circuit 610 is configured to transmit a reply instruction of the second instruction to the power adapter, and the reply instruction of the second instruction is configured to indicate that the current output voltage of the power adapter is proper, high, or low, so as to cause the power adapter to determine the charging voltage of the quick charging mode according to the replay instruction of the second instruction.

Optionally, in an embodiment, a format of the reply instruction corresponding to the second instruction is 1010XX0000, X indicates 1 bit, XX=11 indicates that the current output voltage of the power adapter is proper, XX=10 indicates that the current output voltage of the power adapter is high, XX=01 indicates that the current output voltage of the power adapter is low.

Optionally, in an embodiment, the second instruction is 10100100 or 0xA4.

Optionally, in an embodiment, the communication control circuit 610 is configured to receive the third instruction from the power adapter, and the third instruction is configured to query a maximum charging current which is currently supported by the mobile terminal 600. The communication control circuit 610 is configured to transmit a reply instruction of the third instruction to the power adapter, and the reply instruction of the third instruction is configured to indicate the maximum charging current which is currently supported by the mobile terminal 600, so as to cause the power adapter to determine the charging current of the quick charging mode according to the reply instruction of the third instruction.

Optionally, in an embodiment, the reply instruction of the third instruction includes multiple bits, and the multiple bits of the reply instruction of the third instruction include a bit configured to indicate the maximum charging current which is currently supported by the mobile terminal 600.

Optionally, in an embodiment, a format of the reply instruction of the third instruction is 1010XXXXXX, and X indicates 1 bit. The maximum charging current which is currently supported by the mobile terminal equals to 3000+(XXXXXX*250) mA.

Optionally, in an embodiment, the third instruction is 10100110 or 0xA6.

Optionally, in an embodiment, the communication control circuit 610 is configured to receive the fourth instruction from the power adapter during the constant current phase, and the fourth instruction is configured to query the current voltage of the battery of the mobile terminal 600. The communication control circuit 610 is configured to transmit a reply instruction of the fourth instruction to the power adapter, and the reply instruction of the fourth instruction is configured to indicate the current voltage of the battery of the mobile terminal 600, so as to cause the power adapter to adjust the output current of the power adapter according to the current voltage of the battery.

Optionally, in an embodiment, the reply instruction of the fourth instruction includes multiple bits, and the multiple bits of the reply instruction of the fourth instruction include a bit configured to indicate the current voltage of the battery, and a bit configured to indicate whether the battery is being charged.

Optionally, in an embodiment, a format of the reply instruction of the fourth instruction is 101XYYYYYY, X indicates 1 bit, and Y indicates 1 bit. X=1 indicates that the battery is being charged, and X=0 indicates that the battery is not charged. The current voltage of the battery equals to 3404+(YYYYYY*16) mV.

Optionally, in an embodiment, the fourth instruction is 10100010 or 0xA2.

Optionally, in an embodiment, the communication control circuit 610 is further configured to transmit information for indicating a path impedance of the mobile terminal 600 to the power adapter, so as to cause the power adapter to determine whether the USB interface is in bad contact according to the path impedance during the constant current phase. When the power adapter determines that the USB interface is in bad contact, the communication control circuit 610 receives a fifth instruction from the power adapter, and the fifth instruction is configured to indicate that the USB interface is in bad contact and the power adapter is ready to exit the quick charging mode or reactivate the quick charging communication process.

Optionally, in an embodiment, the fifth instruction is 10110010 or 0xB2.

Optionally, in an embodiment, when the power adapter determines that the reply instruction received from the mobile terminal 600 has an encoding error, the communication control circuit 610 is further configured to execute at least one of following operations: exiting the quick charging mode, stopping charging, or reactivating the quick charging communication.

Optionally, in an embodiment, an instruction transmitted from the mobile terminal 600 to the power adapter includes multiple bits. Before the mobile terminal 600 transmits any instruction, the mobile terminal 600 firstly transmits the MSB of the multiple bits of the any instruction. Or, an instruction received from the power adapter by the mobile terminal 600 includes multiple bits. When the mobile terminal 600 receives a certain instruction, the mobile terminal 600 firstly receives the MSB of the multiple bits of the certain instruction.

Optionally, in an embodiment, the clock signals used in the communication between the power adapter and the mobile terminal are provided by the power adapter.

Optionally, in an embodiment, an instruction transmitted from the power adapter to the mobile terminal 600 includes multiple bits. During a process of transmitting each of the multiple bits, the power adapter firstly transmits each bit, and then transmits a clock interrupt signal. Or, a reply instruction received from the mobile terminal 600 by the power adapter includes multiple bits. During a process of receiving each of the multiple bits, the power adapter firstly transmits the clock interrupt signal, and then receives each bit after a preset time interval.

Optionally, in an embodiment, each instruction transmitted from the power adapter to the mobile terminal 600 includes an 8-bit data. The power adapter transmits the 8-bit data to the mobile terminal 600 via eight continuous clock periods of the clock signal. Level of previous 10 μs of each of the eight continuous clock periods is low level, and level of latter 500 μs of each of the eight continuous clock periods is high level. Or, each reply instruction received from the mobile terminal 600 by the power adapter includes a 10-bit data. The power adapter receives the 10-bit data from the mobile terminal 600 via ten continuous clock periods of the clock signal. Level of previous 500 μs of each of the ten continuous clock periods is high level, and level of latter 10 μs of each of the ten continuous clock periods is low level.

Optionally, in an embodiment, during a process that the power adapter receives an instruction from the mobile terminal 600, a minimum value of high level of the clock signal equals to VDD of the power adapter minus 0.7V. Or, during the process that the power adapter receives an instruction from the mobile terminal 600, a maximum value of low level of the clock signal is 0.8V. Or, during a process that the power adapter transmits an instruction to the mobile terminal 600, the minimum value of the high level of the clock signal equals to 0.25VDD+0.8V. Or, during the process that the power adapter transmits an instruction to the mobile terminal 600, a maximum value of the high level of the clock signal is 4.5V. Or, during the process that the power adapter transmits an instruction to the mobile terminal 600, the maximum value of the low level of the clock signal is 0.15VDD. The VDD is a work voltage of the power adapter, and/or the VDD is greater than 3.2V and less than 4.5V.

Optionally, in an embodiment, after the mobile terminal 600 receives the clock interrupt signal, holding time of a data of an instruction transmitted from the power adapter to the mobile terminal 600 is 500±5 μs.

FIG. 17 is a diagrammatic view of a power adapter in accordance with an embodiment of the present disclosure. A power adapter 700 of FIG. 17 is coupled to a mobile terminal via a USB interface. A power line of the USB interface is used for the power adapter 700 to charge a battery of the mobile terminal, and data lines of the USB interface are used for communication between the power adapter 700 and the mobile terminal. The power adapter 700 supports a normal charging mode and a quick charging mode, and a charging speed of the quick charging mode is greater than that of the normal charging mode. The power adapter 700 includes a communication control circuit 710 and a charging circuit 720.

The communication control circuit 710 is configured to activate a quick charging communication process when the power adapter 700 receives indication information for indicating that the mobile terminal has recognized a type of the power adapter 700 from the mobile terminal, and transmit a first instruction to the mobile terminal, and the first instruction is configured to query whether the mobile terminal agrees to charge the battery in the quick charging mode. The communication control circuit 710 is configured to receive a reply instruction of the first instruction from the mobile terminal, and the reply instruction of the first instruction is configured to indicate that the mobile terminal agrees to charge the battery in the quick charging mode. The communication control circuit 710 is configured to conduct a handshake communication with the mobile terminal via a second instruction to determine a charging voltage of the quick charging mode, conduct a handshake communication with the mobile terminal via a third instruction to determine a charging current of the quick charging mode, adjust an output voltage and an output current of the power adapter to be the charging voltage and the charging current of the quick charging mode to enter a constant current phase, and conduct a handshake communication with the mobile terminal via a fourth instruction during the constant current phase to adjust the output current of the power adapter 700, so as to charge the mobile terminal in a multi-stage constant current mode via the charging circuit 720.

In embodiments of the present disclosure, the power adapter 700 does not increase the charging current blindly for quick charging, but negotiates with the mobile terminal via communication with the mobile terminal to determine whether the quick charging mode can be adopted. Comparing with the present technology, the security of the quick charging process is improved.

Optionally, in an embodiment, the communication control circuit 710 is further configured to detect a charging current provided to the mobile terminal by the power adapter 700, determine that the mobile terminal has recognized the type of the power adapter 700 when the power adapter 700 does not receive the indication information and determines that within a preset time period the charging current provided to the mobile terminal by the power adapter 700 is greater than or equals to a preset current threshold, activate the quick charging communication process, and transmit the first instruction to the mobile terminal.

Optionally, in an embodiment, the reply instruction of the first instruction includes multiple bits, and the multiple bits include a bit configured to indicate whether the mobile terminal agrees to activate the quick charging mode, and a bit configured to indicate a path impedance of the mobile terminal. The path impedance of the mobile terminal is used for the power adapter 700 to determine whether the USB interface is in good contact.

Optionally, in an embodiment, a format of the reply instruction of the first instruction is 101XYYYYYY, X indicates 1 bit, and Y indicates 1 bit. X=1 indicates that the mobile terminal agrees to activate the quick charging mode, X=0 indicates that the mobile terminal disagrees to activate the quick charging mode, and the path impedance of the mobile terminal equals to YYYYYY*5mΩ.

Optionally, in an embodiment, the first instruction is 10101000 or 0xA8.

Optionally, in an embodiment, the communication control circuit 710 is configured to transmit the second instruction to the mobile terminal, and the second instruction is configured to query whether a current output voltage of the power adapter 700 is proper to be the charging voltage of the quick charging mode. The communication control circuit 710 is configured to receive the reply instruction of the second instruction from the mobile terminal, and the reply instruction of the second instruction is configured to indicate that the current output voltage of the power adapter 700 is proper, high, or low. The communication control circuit 710 is configured to determine the current output voltage of the power adapter 700 to be the charging voltage of the quick charging mode when the reply instruction of the second instruction indicates that the current output voltage of the power adapter 700 is proper, adjust the current output voltage of the power adapter 700 according to the reply instruction of the second instruction when the reply instruction of the second instruction indicates that the current output voltage of the power adapter 700 is high or low, and repeat the handshake communication based on the second instruction to constantly adjust the current output voltage of the power adapter 700 until the reply instruction of the second instruction indicates that the current output voltage of the power adapter 700 is proper.

Optionally, in an embodiment, the reply instruction of the second instruction includes multiple bits, and the multiple bits of the reply instruction of the second instruction include a bit configured to indicate the current output voltage of the power adapter 700 is proper, high, or low.

Optionally, in an embodiment, a format of the reply instruction corresponding to the second instruction is 1010XX0000, X indicates 1 bit, XX=11 indicates that the current output voltage of the power adapter 700 is proper, XX=10 indicates that the current output voltage of the power adapter 700 is high, and XX=01 indicates that the current output voltage of the power adapter 700 is low.

Optionally, in an embodiment, the second instruction is 10100100 or 0xA4.

Optionally, in an embodiment, the communication control circuit 710 is configured to transmit the third instruction to the mobile terminal, and the third instruction is configured to query a maximum charging current which is currently supported by the mobile terminal. The communication control circuit 710 is configured to receive the reply instruction of the third instruction from the mobile terminal, and the reply instruction of the third instruction is configured to indicate the maximum charging current which is currently supported by the mobile terminal. The communication control circuit 710 is configured to determine the charging current of the quick charging mode according to the reply instruction of the third instruction.

Optionally, in an embodiment, the reply instruction of the third instruction includes multiple bits, and the multiple bits of the reply instruction of the third instruction include a bit configured to indicate the maximum charging current which is currently supported by the mobile terminal.

Optionally, in an embodiment, a format of the reply instruction of the third instruction is 1010XXXXXX, X indicates 1 bit, and the maximum charging current which is currently supported by the mobile terminal equals to 3000+(XXXXXX*250)mA.

Optionally, in an embodiment, the third instruction is 10100110 or 0xA6.

Optionally, in an embodiment, the communication control circuit 710 is configured to transmit the fourth instruction to the mobile terminal during the constant current phase, and the fourth instruction is configured to query a current voltage of the battery of the mobile terminal. The communication control circuit 710 is configured to receive the reply instruction of the fourth instruction from the mobile terminal, and the reply instruction of the fourth instruction is configured to indicate the current voltage of the battery of the mobile terminal. The communication control circuit 710 is configured to adjust the output current of the power adapter 700 according to the current voltage of the battery.

Optionally, in an embodiment, the reply instruction of the fourth instruction includes multiple bits, and the multiple bits of the reply instruction of the fourth instruction include a bit configured to indicate the current voltage of the battery, and a bit configured to indicate whether the battery is being charged.

Optionally, in an embodiment, a format of the reply instruction of the fourth instruction is 101XYYYYYY, X indicates 1 bit, Y indicates 1 bit, X=1 indicates that the battery is being charged, X=0 indicates that the battery is not charged, and the current voltage of the battery equals to 3404+(YYYYYY*16)mV.

Optionally, in an embodiment, the fourth instruction is 10100010 or 0xA2.

Optionally, in an embodiment, the communication control circuit 710 is further configured to receive impedance information for indicating a path impedance of the mobile terminal from the mobile terminal, determine an impedance of a charging circuit from the power adapter 700 to the battery according to the current output voltage of the power adapter 700 and the current voltage of the battery during the constant current phase, determine whether the USB interface is in bad contact according to the impedance of the charging circuit, the path impedance of the mobile terminal, and a path impedance of a charging circuit between the power adapter 700 and the mobile terminal, and exit the quick charging mode or redetermine whether to activate the quick charging mode when the USB interface is in bad contact.

Optionally, in an embodiment, the communication control circuit 710 is configured to transmit a fifth instruction to the mobile terminal when the USB interface is in bad contact. The fifth instruction is configured to indicate that the USB interface is in bad contact and the power adapter 700 is ready to exit the quick charging mode or redetermine whether to activate the quick charging mode.

Optionally, in an embodiment, the fifth instruction is 10110010 or 0xB2.

Optionally, in an embodiment, the communication control circuit 710 is further configured to execute at least one of following operations when the power adapter 700 determines that the reply instruction received from the mobile terminal has an encoding error, and the following operations includes: exiting the quick charging mode, stopping charging, or reactivating the quick charging communication process.

Optionally, in an embodiment, an instruction transmitted from the power adapter 700 to the mobile terminal includes multiple bits. When the power adapter transmits any instruction, the power adapter 700 firstly transmits the MSB of multiple bits of the any instruction. Or an instruction received from the mobile terminal by the power adapter 700 includes multiple bits. When the power adapter 700 receives an instruction, the power adapter 700 firstly receives the MSB of multiple bits of the instruction.

Optionally, in an embodiment, clock signals or clock interrupt signals used in the communication between the power adapter 700 and the mobile terminal are provided by the power adapter 700.

Optionally, in an embodiment, an instruction transmitted from the power adapter 700 to the mobile terminal includes multiple bits. During a process of transmitting each of the multiple bits, the power adapter 700 firstly transmits each bit, and then transmits the clock interrupt signal. Or a reply instruction received from the mobile terminal by the power adapter 700 includes multiple bits. During a process of receiving each of the multiple bits, the power adapter 700 firstly transmits the clock interrupt signal, and then receives each bit after a preset time interval.

Optionally, in an embodiment, each instruction transmitted from the power adapter 700 to the mobile terminal includes an 8-bit data. The power adapter 700 transmits the 8-bit data to the mobile terminal via eight continuous clock periods of the clock signal, level of previous 10 μs of each of the eight continuous clock periods is low level, and level of latter 500 μs of each of the eight continuous clock periods is high level. Or each reply instruction received from the mobile terminal by the power adapter 700 includes a 10-bit data, the power adapter 700 receives the 10-bit data from the mobile terminal via ten continuous clock periods of the clock signal, level of previous 500 μs of each of the ten continuous clock periods is high level, and level of latter 10 μs of each of the ten continuous clock periods is low level.

Optionally, in an embodiment, during a process that the power adapter 700 receives an instruction from the mobile terminal, a minimum value of high level of the clock signal equals to VDD of the power adapter 700 minus 0.7V. Or during the process that the power adapter 700 receives an instruction from the mobile terminal, a maximum value of low level of the clock signal is 0.8V. Or during a process that the power adapter 700 transmits an instruction to the mobile terminal, the minimum value of the high level of the clock signal equals to 0.25VDD+0.8V. Or during the process that the power adapter 700 transmits an instruction to the mobile terminal, a maximum value of the high level of the clock signal is 4.5V. Or during the process that the power adapter

700 transmits an instruction to the mobile terminal, the maximum value of the low level of the clock signal is 0.15VDD. The VDD is a work voltage of the power adapter 700, and/or the VDD is greater than 3.2V and less than 4.5V.

Optionally, in an embodiment, after the mobile terminal receives the clock interrupt signal, holding time of a data of an instruction transmitted from the power adapter 700 to the mobile terminal is 500±5 μs.

Those skilled in the art should appreciate that units and programming steps of various examples described in the embodiments of the present disclosure can be realized by electronic hardware or a combination of computer software and electronic hardware. Whether these functions are realized by hardware or software depends on particular applications and design constraint conditions. For each particular application, professionals can employ different methods to realize described functions, but this realization should fall into the scope of the present disclosure.

For convenience and simplicity, those skilled in the art can clearly understand that when the specific work processes of the above described systems, devices, and units are described, the corresponding processes of the above method embodiments can be referred, which will not be repeated herein.

In several embodiments provided by the present disclosure, it can be understood that the disclosed systems, devices, and methods can be implemented by other manners. For example, the device embodiments described above are only schematic. For example, the units are divided according to logic functions and can be divided by another manner in an actual implementation. For example, several units or assemblies can be combined or can be integrated into another system, or some features can be ignored, or are not executed. Another point is that mutual coupling or direct coupling or communication connection shown or discussed herein can be indirect coupling or communication connection through certain interfaces, devices, or units, and can be in the form of electricity, machine, or other.

The units illustrated as separate units can be or cannot be physically separated, and components shown in units can be or cannot be physical units, that is, can be in a place, or can be distributed in several network units. A part of or all of the units can be selected according to actual need to realize the purpose of the solution of the embodiments.

Additionally, various functional units in the embodiments of the present disclosure can be integrated into one processing unit, or various functional units can exist alone, or two or more units can be integrated into one unit.

If the functions can be realized in the form of software functional units and can be sold or used as stand-alone products, they can be stored in a computer-readable storage medium. Based on such understanding, the technical solution of the present disclosure or the part that contributes to the existing technology or a part of the technical solution can be embodied in the form of a software product. The computer software product can be stored in a storage medium, and include a plurality of instructions configured to direct a computer device (personal computer, server, or network device) to execute all of or a part of steps of various embodiments of the present disclosure. The storage mediums described above include a U disk, a mobile disk, a read-only memory (ROM), a random access memory (RAM), a disc, a compact disc, or other medium storing program codes.

The foregoing descriptions are merely preferred embodiments of the present disclosure, rather than limiting the present disclosure. Any one skilled in the art can easily make change or alterations within the technology range of the present disclosure, and those change or alterations shall fall within the protection scope of the present disclosure. Therefore, the protection scope of the present disclosure shall be limited by the protection scope of the claims.

What is claimed is:

1. A charging method, comprising:

conducting a handshake communication between a terminal device and a power supply device through a universal serial bus (USB) interface, to determine to charge a battery of the terminal device in a quick charging mode and determine a charging voltage or a charging current of the quick charging mode;

adjusting an output voltage or an output current output to the terminal device according to the charging voltage or the charging current of the quick charging mode to enter a constant current phase; and conducting a handshake communication with the terminal device during the constant current phase to adjust the output current or the output voltage output to the terminal device;

wherein at least one of the following is comprised:

when the power supply device transmits an instruction that comprises a plurality of bits, the power supply device firstly transmits a most significant bit (MSB); or when the power supply device receives an instruction that comprises a plurality of bits, the power supply device firstly receives a MSB;

wherein the charging method further comprises:

conducting a handshake communication with the terminal device during the constant current phase to determine an impedance of a charging path of the terminal device;

determining whether coupling with the terminal device via the USB interface is bad according to the impedance of the charging path of the terminal device; and exiting the quick charging mode based on a determination that the coupling with the terminal device is bad.

2. The method of claim 1, further comprising:

executing, based on a determination that an error occurs in encoding with a reply instruction from the terminal device, at least one of the following: exiting the quick charging mode and stopping charging the terminal device.

3. The method of claim 1, wherein in the constant current phase, multiple constant current charging stages corresponding to different charging currents are conducted successively.

4. The method of claim 1, wherein conducting the handshake communication between the terminal device and the power supply device to determine the charging voltage of the quick charging mode comprises:

conducting the handshake communication with the terminal device to determine whether the current output voltage output to the terminal device is proper to be the charging voltage of the quick charging mode;

determining the current output voltage output to the terminal device to be the charging voltage of the quick charging mode based a determination that the current output voltage output to the terminal device is proper; and adjusting the current output voltage output to the terminal device based on a determination that the current output voltage output to the terminal device is high or low.

5. The method of claim 1, wherein conducting the handshake communication with the terminal device in the constant current phase to adjust the output current or the output voltage output to the terminal device comprises:

conducting the handshake communication with the terminal device to receive voltage information; and adjusting the output current or the output voltage output to the terminal device according to the voltage information.

6. The method of claim 1, wherein conducting the handshake communication between the terminal device and the power supply device to determine to charge the battery of the terminal device in the quick charging mode comprises:

transmitting an instruction to the terminal device to query whether the terminal device agrees to charge the terminal device in the quick charging mode; and receiving a reply instruction from the terminal device, wherein the reply instruction is indicative of charging the terminal device in the quick charging mode.

7. The method of claim 1, wherein conducting the handshake communication between the terminal device and the power supply device to determine the charging current of the quick charging mode comprises:

transmitting an instruction to the terminal device to query a maximum charging current which is currently supported by the terminal device; and receiving a reply instruction from the terminal device, wherein the reply instruction indicates the maximum charging current which is currently supported by the terminal device; and determining the charging current of the quick charging mode based on the reply instruction.

8. A charging method comprising:

conducting a handshake communication between a terminal device and a power supply device through a universal serial bus (USB) interface, to determine to charge a battery of the terminal device in a quick charging mode and determine a charging voltage or a charging current of the quick charging mode; and after the power supply device adjusts an output voltage or an output current of the power supply device according to the charging voltage or the charging current of the quick charging mode and enters a constant current phase, conducting a handshake communication with the power supply device, such that the power supply device adjusts the output current or the output voltage of the power supply device in the constant current phase;

wherein at least one of the following is comprised:

when the terminal device transmits an instruction that comprises a plurality of bits, the terminal device firstly transmits a most significant bit (MSB); or when the terminal device receives an instruction that comprises a plurality of bits, the terminal device firstly receives a MSB;

wherein the charging method further comprises:

conducting a handshake communication with the power supply device during the constant current phase to inform the power supply device of an impedance of a charging path of the terminal device, such that the power supply device determines whether coupling with the terminal device via the USB interface is bad according to the impedance of the charging path of the terminal device and exits the quick charging mode based on a determination that the coupling with the terminal device is bad.

9. The method of claim 8, further comprising:

executing, based on a determination that an error occurs in encoding a reply instruction from the terminal device, at least one of the following: exiting the quick charging mode and stopping charging the terminal device.

10. The method of claim 8, wherein conducting the handshake communication between the terminal device and the power supply device to determine the charging voltage of the quick charging mode comprises:

conducting the handshake communication with the power supply device to determine whether the current output voltage output to the terminal device is proper to be the charging voltage of the quick charging mode, such that the power supply device determines the current output voltage output to the terminal device to be the charging voltage of the quick charging mode based a determination that the current output voltage output to the terminal device is proper, and adjusts the current output voltage output to the terminal device based on a determination that the current output voltage output to the terminal device is high or low.

11. The method of claim 8, wherein after the power supply device adjusts the output voltage or the output current of the power supply device according to the charging voltage or the charging current of the charging mode and enters the constant current phase, conducting the handshake communication with the power supply device comprises:

conducting the handshake communication with the power supply device to transmit voltage information to the power supply device, such that the power supply device adjusts the output current or the output voltage of the power supply device according to the voltage information.

12. The method of claim 8, wherein in the constant current phase, multiple constant current charging stages corresponding to different charging currents are conducted successively.

13. A terminal device comprising:

a processor; and a computer-readable memory, coupled to the processor and storing a computer program therein which, when executed by the processor, causes the processor to:

conduct a handshake communication between the terminal device and a power supply device through a universal serial bus (USB) interface, to determine to charge a battery of the terminal device in a quick charging mode and determine a charging voltage or a charging current of the quick charging mode; and after the power supply device adjusts an output voltage or an output current of the power supply device according to the charging voltage or the charging current of the quick charging mode and enters a constant current phase, conduct a handshake communication with the power supply device, such that the power supply device adjusts the output current or the output voltage of the power supply device in the constant current phase;

wherein at least one of the following is comprised:

when the terminal device transmits an instruction that comprises a plurality of bits, the terminal device firstly transmits a most significant bit (MSB); or when the terminal device receives an instruction that comprises a plurality of bits, the terminal device firstly receives a MSB;

wherein the computer program, when executed by the processor, further causes the processor to:

conduct a handshake communication with the power supply device during the constant current phase to inform the power supply device of an impedance of a charging path of the terminal device, such that the power supply device determines whether coupling with the terminal device via the USB interface is bad according to the impedance of the charging path of the terminal device and exits the quick charging mode based on a determination that the coupling with the terminal device is bad.

14. The terminal device of claim 13, wherein the computer program, when executed by the processor, further causes the processor to:

execute, based on a determination that an error occurs in encoding a reply instruction from the terminal device, at least one of the following: exiting the quick charging mode and stopping charging the terminal device.

15. The terminal device of claim 13, wherein the computer program causing the processor to conduct the handshake communication between the terminal device and the power supply device to determine the charging voltage of the quick charging mode causes the processor to:

conduct the handshake communication between the terminal device and the power supply device to determine whether the current output voltage output to the terminal device is proper to be the charging voltage of the quick charging mode, such that the power supply device determines the current output voltage output to the terminal device to be the charging voltage of the quick charging mode based a determination that the current output voltage output to the terminal device is proper, and adjusts the current output voltage output to the terminal device based on a determination that the current output voltage output to the terminal device is high or low.

16. The terminal device of claim 13, wherein the computer program causing the processor to conduct, after the power supply device adjusts the output voltage or the output current of the power supply device according to the charging voltage or the charging current of the charging mode and enters the constant current phase, the handshake communication with the terminal device and the power supply device causes the processor to:

conduct the handshake communication between the terminal device and the power supply device to transmit voltage information to the power supply device, such that the power supply device adjusts the output current or the output voltage of the power supply device according to the voltage information.

17. The terminal device of claim 13, wherein in the constant current phase, multiple constant current charging stages corresponding to different charging currents are conducted successively.

* * * * *